US012539899B2

(12) United States Patent
Pollock

(10) Patent No.: US 12,539,899 B2
(45) Date of Patent: Feb. 3, 2026

(54) DERAILING SYSTEM

(71) Applicant: Westinghouse Air Brake Technologies Corporation, Wilmerding, PA (US)

(72) Inventor: Jarred Michael Pollock, Berwick, PA (US)

(73) Assignee: Westinghouse Air Brake Technologies Corporation, Pittsburgh, PA (US)

( * ) Notice: Subject to any disclaimer, the term of this patent is extended or adjusted under 35 U.S.C. 154(b) by 786 days.

(21) Appl. No.: 17/661,226

(22) Filed: Apr. 28, 2022

(65) Prior Publication Data
US 2022/0250663 A1 Aug. 11, 2022

Related U.S. Application Data

(63) Continuation-in-part of application No. 16/556,053, filed on Aug. 29, 2019, now Pat. No. 11,332,171.

(51) Int. Cl.
B61K 5/06 (2006.01)

(52) U.S. Cl.
CPC ..................... B61K 5/06 (2013.01)

(58) Field of Classification Search
CPC ........................................................ B61K 5/06
See application file for complete search history.

(56) References Cited

U.S. PATENT DOCUMENTS

| 4,165,060 A * | 8/1979 | Meyer | B61K 7/20 246/163 |
| 4,386,751 A * | 6/1983 | Meyer | E01B 5/18 246/456 |
| 5,211,266 A * | 5/1993 | Meyer | B61K 7/20 188/62 |
| 6,105,906 A * | 8/2000 | Pease | B61K 5/06 246/163 |
| 6,155,178 A * | 12/2000 | Pease | B61K 7/20 104/258 |
| 6,168,120 B1 * | 1/2001 | Pease | B61L 5/00 246/414 |
| 6,178,893 B1 * | 1/2001 | Pease | B61K 5/06 104/271 |
| 6,202,564 B1 * | 3/2001 | Hart | B61K 5/06 246/163 |
| 6,307,339 B1 * | 10/2001 | Yourist | B61L 29/08 318/266 |
| 6,308,638 B1 | 10/2001 | Pease | |

(Continued)

FOREIGN PATENT DOCUMENTS

| CA | 3017596 A1 * | 3/2019 | ............ B61K 5/06 |
| CN | 201380860 Y * | 1/2010 | |
| WO | WO-2015163768 A1 * | 10/2015 | ............ B61K 5/06 |

*Primary Examiner* — Jason C Smith

(57) ABSTRACT

A derailing system includes a derailer device and an electronic communication unit. The derailer device includes a directional derail block extending from a base and including a wheel deflecting surface arranged at an angle less than or equal to about 13 degrees with regard to a longitudinal axis of the track and designed to deflect the wheel away from the track. The electronic communication unit is configured for attachment to the derailer device and to communicate location data of the derailer device and/or installation status data of the derailer device to a remote computing unit.

20 Claims, 16 Drawing Sheets

(56) References Cited

U.S. PATENT DOCUMENTS

| | | | | |
|---|---|---|---|---|
| 6,327,818 | B1* | 12/2001 | Pease | E01F 13/06 |
| | | | | 49/49 |
| 6,966,146 | B2* | 11/2005 | Pease | B61L 29/10 |
| | | | | 49/49 |
| 7,549,611 | B2* | 6/2009 | Hertel | B61K 5/06 |
| | | | | 246/163 |
| 7,909,293 | B2* | 3/2011 | Pease | B61K 5/06 |
| | | | | 246/163 |
| 8,262,033 | B2* | 9/2012 | Pease | B61K 5/06 |
| | | | | 246/163 |
| 10,427,698 | B2* | 10/2019 | McCarthy | B61K 5/06 |
| 11,332,171 | B2* | 5/2022 | Pollock | B61K 5/06 |
| 2017/0217456 | A1* | 8/2017 | McCarthy | B61L 23/00 |
| 2021/0061321 | A1* | 3/2021 | Pollock | B61K 5/06 |

\* cited by examiner

DERAILING SYSTEM

CROSS-REFERENCE TO RELATED APPLICATIONS

This application is a continuation-in-part of U.S. Non-Provisional patent application Ser. No. 16/556,053, entitled "DERAILING DEVICE", and filed on Aug. 29, 2019. The entire contents of the above-listed application are hereby incorporated by reference for all purposes.

BACKGROUND

Vehicle derailing devices are used to guide vehicles off of the tracks on which they are traveling. For example, a derailing device may be placed on tracks adjacent to workers or other personnel, allowing an errant vehicle to be derailed prior to traveling into the person's vicinity. In other situations, vehicle derailing devices may be deployed near railway junctions to prevent inadvertent vehicle travel onto unwanted tracks. Previous derailing devices, however, have only been designed to derail vehicles traveling at low speeds, such as speeds less than 16 kilometers per hour (km/h) (approximately 10 miles per hour (mph)). Therefore, in operating environments where the derailing devices are deployed vehicle speed may be limited. Limiting vehicle speeds decreases the system's efficiency with regard to the movement of cargo (e.g., freight, goods, merchandise, etc.), passengers, etc., through the environment. Monetary losses may stem from the cargo transportation inefficiencies.

Additionally, some derailing devices have been made portable to allow personnel to transport and install the devices. Higher maximum yard speeds can improve yard efficiency. Increasing a derailing device's upper threshold speed, for example by increasing the size of the device, may be at odds with maintaining device portability. Furthermore, a vehicle's front end (e.g., pilot, bumper, etc.) may dislodge the derailing device if its height surpasses a threshold value, constraining the degree to which the device can be sized up.

BRIEF DESCRIPTION

In an embodiment, a system (e.g., a derailer system) includes a derailer device and an electronic communication unit. The derailer device includes a first derail block extending from a base and including a wheel deflecting surface. The wheel deflecting surface is configured to be arranged at a first angle relative to a longitudinal axis of a track when the derailer device is attached to the track and configured to deflect a wheel of a vehicle away from and off the track. The first angle is less than or equal to about 13 degrees. The derailer device also includes at least three clamping mechanisms positioned along the base and configured to engage with a rail of the track on a side of the track opposite the wheel deflecting surface and toward which the wheel is deflected by the wheel deflecting surface. Each of the at least three clamping mechanisms is spaced apart from one another so as to enable forces to be dispersed as the wheel is deflected away from and off the track. The electronic communication unit is attached to the derailer device and configured to communicate at least one of location data of the derailer device and/or installation status data of the derailer device to a remote computing unit.

In an embodiment, a system (e.g., a derailer system) includes a derailer device and an electronic communication unit. The derailer device includes a first derail block extending from a base and including a wheel deflecting surface. The wheel deflecting surface is configured to be arranged at a first angle relative to a longitudinal axis of a track when the derailer device is attached to the track and configured to deflect a wheel of a vehicle away from and off the track. The derailer device also includes plural clamping mechanisms positioned along the base and configured to engage with a rail of the track on a side of the track opposite the wheel deflecting surface and toward which the wheel is deflected by the wheel deflecting surface. The electronic communication unit is configured for attachment to the derailer device and configured to communicate at least one of location data of the derailer device and/or installation status data of the derailer device to a remote computing unit.

BRIEF DESCRIPTION OF THE FIGURES

FIGS. 1-27 are drawn approximately to scale. However, other relative dimensions of the system's components may be used, in other embodiments.

DETAILED DESCRIPTION

Figure 1:
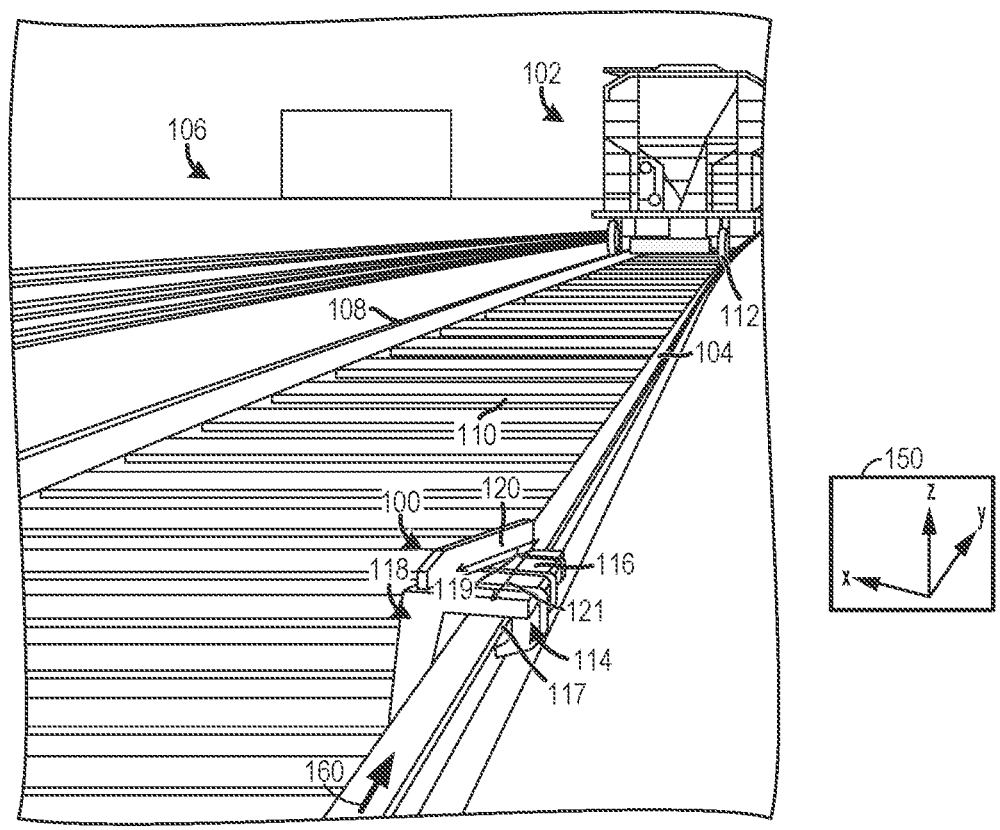
FIG. 1 shows a first embodiment of a device installed on a track on which a vehicle is traveling.

Embodiments relate to a device (e.g., a portable derailing device) having a base, a derail block, and plural clamping mechanisms. The derail block includes a wheel deflecting surface, which is configured to be arranged or disposed at an angle with regard to a longitudinal axis of a track when the device is attached to the track using the clamping mechanisms; the wheel deflecting surface is configured to deflect a wheel of a vehicle away from and off of the track. Based on one or more of an overall length of the device, the angle of the wheel deflecting surface, the number of clamping mechanisms, etc., the device may serve to derail relatively more massive and/or faster traveling vehicles (i.e., vehicles with more kinetic energy) without damage to the device.

In one aspect, the maximum rail speed of a railyard may be set according to the maximum speed that the portable derail device can successfully derail any vehicle in the yard. At the same time, the derail device may be transported, possibly by hand, to various locations of the device with relatively little time available before it should be operational. Increasing the speed at which the device can still successfully derail a vehicle, such as a heavy locomotive, while maintaining portability and ease of installation and removal, and also maintaining the integrity of the device itself (such that the wheels of the vehicle do not simply shear the device into pieces), may increase transportation efficiencies. Such increased capacity (i.e., derailing faster and/or more massive vehicles) results, at least in part, from how the device shifts the vehicle wheels off the rail as the vehicle continues to move forward despite the position and direction of the reaction forces from the rail against the device during the transition varying widely during the transient engagement as the vehicle begins to shift sideways. The flexure of the device, along with the shear forces, depends not only on the angle of the wheel deflecting surface along with the vehicle's mass and speed, but also the reaction locations of the clamping along the length of the device.

In some examples, the angle of the wheel deflecting surface may vary along the length of the device, for example beginning with a shallower angle and becoming steeper at one or more locations along the length of the device. The angle may have various linear sections, and/or may be curved at least in some regions. In this way, it may be possible to allow higher speeds as the maximum reaction and shear forces handled by the device throughout the derail event can be lowered and the forces spread over a greater duration taking advantage of the lateral acceleration being decreased upon initial contact with the angled wheel deflecting surface.

Alternatively, or in addition, the device may include a communication unit and sensors allowing for location, status (e.g., whether the device is installed, uninstalled, a direction of installation, the device integrity (e.g., whether it has been sheared)), etc., to be monitored remotely and/or electronically.

In another example, a device including a directional or bi-directional derail block configured to deflect a wheel of a vehicle away from a track is articulated in the description. The angular arrangement of the wheel deflecting surface and the length of the device, as well as the clamping arrangement, allow the device to derail vehicles traveling at relatively higher speeds while achieving device portability.

In one example, the angle of the wheel deflecting surface, as measured from a longitudinal axis of the track, may be less than or equal to 13 degrees, the length of the device may be greater than or equal to about 53 centimeters (cm) (21 inches (in)), such as within 5% of these values, and/or the device may be secured to the rail at a plurality of positions along the length of the device. The aforementioned ranges of device length and deflecting surface angular alignment allow the device to derail vehicle traveling at higher speeds (e.g., speeds greater than or equal to about 24 kilometers per hour (km/h) (15 miles per hour (mph), such as within 5% of these values) when compared to devices with steeper derail block angles, while maintaining device portability. Device portability, as defined herein, is the capability of the device to be carried or otherwise transported by a single person of average strength.

In one example, the device's weight may be less than or equal to about 29 kilograms (kg) (65 pounds (lb)), such as within 5% of these values, to maintain portability. When the weight is within this range personnel can transport and install the device at desired locations in a railyard or other suitable operating environments.

In another example, the device may further include a grab plate having a plurality of steps. Each of the steps may have a rise greater than or equal to about 1 cm (0.4 in) and a run greater than or equal to about 2 cm (0.8 in), such as within about 5% of these values. Designing the device with a grab plate exhibiting these structural characteristics allows the device to derail vehicles traveling at relatively higher speeds (e.g., 120+ metric ton locomotives traveling at speeds of about 24 km/h (15 mph)) without necessitating an increase in device length and therefore weight, if desired.

FIG. 1 illustrates a first embodiment of a device 100 configured to derail a vehicle 102 off of a first rail of track 104, when in operation. The vehicle 102 shown in FIG. 1 is a railway vehicle (e.g., rail car, locomotive, handcar, and/or other rail vehicle or combinations thereof). However, the device 100 may be configured to derail vehicles such as on-road vehicles or road-rail vehicles. The locomotive may be freight locomotives (e.g., locomotives generating at least 2982.799 kilowatts (kW) (4000 horsepower (hp)), heavy-haul locomotives generating at least 4474.2 kW (6000 hp), passenger locomotives generating 1491.4 kW (2000 hp) or less, etc.

The vehicle 102 is located in a railway yard 106, in FIG. 1. However, the device may be deployed in a variety of suitable operating environments such as track junctions, railway stations, rail to ship terminals, etc. As described herein, a track includes a rail or other suitable path along which a wheel of the vehicle 102 travels and interfaces with. As such, the device may be used in different operation environments where vehicles are traveling along one or more tracks. In the locomotive context, the first track 104 may be manufactured out of a suitable metal, such as steel. Steel is harder and stronger than aluminum, for example, and therefore may be used to construct tracks slated for locomotive use. However, in other operating environments the first track 104 may be constructed out of a variety of suitable materials, such as ceramic materials, polymeric materials, forestry products, other metal materials, combinations thereof, etc. Materials such as ceramics, polymers, etc., have tradeoffs when compared to steel with regard to durability and strength, for instance.

The vehicle 102 is shown traveling on the first track 104 and a second track 108 with ties 110 extending there between. Wheels 112 of the vehicle 102 interface with the first track 104 and the second track 108. In other embodiments, the device 100 may be deployed in environments where the vehicle travels along a single track (e.g., monorail) or more than two tracks. The vehicle is shown positioned down track of the derailing device 100. However, prior to derailment the vehicle will initially be positioned up track of the device 100 and travel in direction 160 towards the device.

The device 100 may include a plurality of clamping mechanisms 114. The clamping mechanisms 114 attach the device to the first track 104 and extend from a base 116. In one example, the clamping mechanisms 114 may be equally spaced along the base 116. However, in other examples, the clamping mechanism may have unequal spacing along the base. The clamping mechanisms 114 exert a clamping force on a section 117 (e.g., lip) of the first track 104 when the device is installed. The clamping mechanisms may have a C-shape with an upper and lower clamping arm. However, other suitable clamping mechanism configurations have been envisioned such as mechanisms with hinges, length adjustable arms, length adjustable bodies, etc.

The device 100 may include a grab plate 118. The grab plate 118 functions to arrest movement of the device in the direction of vehicle travel when derailing a vehicle. The grab plate may include a stepped surface mating with the ties 110 to hinder movement of the device in the direction of vehicle travel, and thereby keep the device in a desired location.

The device 100 includes a directional derail block 120 extending from the base 116. The directional derail block 120 is configured to deflect one of the wheels 112 off the first track 104. The directional derail block 120 may be coupled to the base 116 via welds, mechanical devices (e.g., bolts and/or clamps), combinations thereof, etc.

The directional derail block 120, in the illustrated embodiment, includes a wheel deflecting surface angularly positioned (when the device is installed for use) in relation to a longitudinal axis 121 of the track 104. The angle 119 may be, for example, less than or equal to 13 degrees, decreasing the loads experienced by the device during vehicle derailment in comparison to devices with steeper deflecting angles. Consequently, the device has the ability to derail vehicles traveling at higher speeds than other devices. Specifically, in one example, the speed of the vehicle (e.g., heavy haul locomotive) being derailed may be greater than or equal about 24 km/h (15 mph), in some cases. Other derail block angular ranges have been contemplated such as an angle that is less than or equal to 10 degrees. Arranging the derail block in this angular range allows the loads experienced by the device during derailment to be further decreased, if desired. In yet another example, the angle may be less than or equal to 9 degrees to even further decrease the chance of device degradation caused by intensified loading during vehicle derailment. However, the length and therefore the weight of the device may be increased when the angle of the derail device is decreased to allow the device to laterally deflect the wheel by a desired amount.

In certain embodiments, the angle of the wheel deflecting surface relative to the track axis (when the device is installed for use) is from 9 degrees to 13 degrees. In other embodiments, the angle of the wheel deflecting surface relative to the track axis (when the device is installed for use) is from 10 degrees to 13 degrees. In either case, the overall length of the device may be at least 53 cm (21 in) or at least 60 cm (24 in) in conjunction with the device weighing no more than 29 kg (65 lb).

In other embodiments, the derail block may include two or more distinctly angled wheel deflecting surfaces. The angles of the wheel deflecting surfaces sequentially increase to allow device loading to be gradually stepped up during vehicle derailment. Consequently, the likelihood of device degradation caused by intensified loading is reduced, resulting in increased device durability and longevity. To elaborate, designing the device with two or more angularly distinct deflecting surfaces allows the device to derail the vehicle in a shorter throw without exceeding threshold stress levels, if desired.

In another embodiment, the device may incorporate a curved wheel deflecting surface arcing away from the track into the derail block. Arcing the deflecting surface away from the track enables additional tuning of device load distribution occurring during vehicle derailment. As such, device loading occurring during vehicle derailment may exhibit a non-linear profile. Tailoring the loading profile in this manner can allow loads to be distributed to stronger sections of the device, if desired.

In other device configurations, one wheel deflecting surface, such as the leading wheel deflecting surface, may be curved while another wheel deflecting surface may be planar. In this way, device loading will occur non-linearly in a first stage of derailing operation. Subsequently, in a second stage of derailing operation the device is linearly loaded, to allow for more granular adjustment of load distribution across the device during vehicle derailing operation. The design of the device's reinforcement may take into account the device's loading profile to strengthen the device in sections expected to experience higher stress. For example, when the wheel deflecting surface is curved additional reinforcement plates may be added to locations in the device adjacent to a section of the deflecting surface with a relatively steep curvature.

Embodiments of the device with integrated location and/or clamping sensors may also be utilized. The sensors are configured to transmit signals to one or more remote computing devices. Using sensors in this manner allows existing computing systems in the device's operating environment, such as railyard computing management systems, to gather additional data streams to expand situation awareness of personnel within the environment, increase system efficiency, generate alerts, etc.

Axis system 150 is provided in FIG. 1 as well as FIGS. 2-27, when applicable, to establish a common frame of reference between the figures. In one example, the z-axis may be parallel to a vertical axis (e.g., gravitational axis), the x-axis may be a lateral axis and the y-axis may be a longitudinal axis. However, other orientations of the axes may be used, in other examples.

Figure 2:
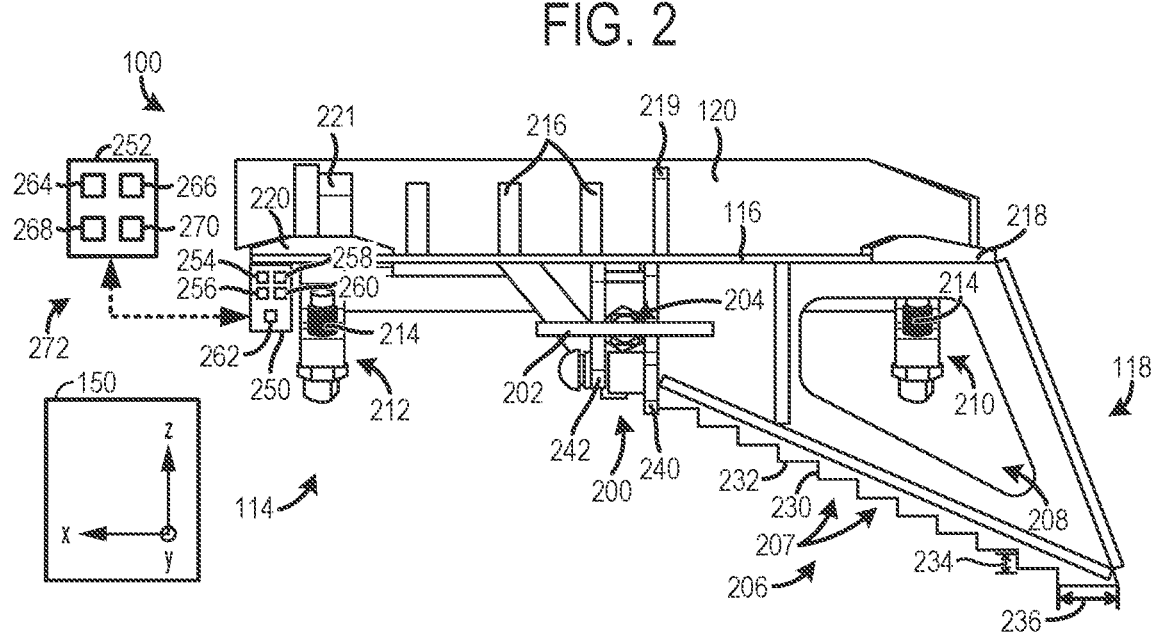
FIG. 2 shows a side view of the device, depicted in FIG. 1.

FIG. 2 shows a detailed side view of the device 100. The directional derail block 120, base 116, the plurality of clamping mechanisms 114, and the grab plate 118 in the device 100 are again shown. The device 100 may further include an attachment assembly 200 with an attachment component 202 (e.g., bolt) threading or otherwise adjustably attaching to a recess 204, allowing for lateral clamping adjustment between the device and the track.

FIG. 2 depicts a first lock support plate 240 positioned on a first side of the attachment assembly 200 and a second lock support plate 242 positioned on a second side of the attachment assembly. The first and second lock support plates may be adjusted to allow the position of the device with regard to the track to be varied. However, in other examples, one or both of the lock support plates may be omitted from the device.

The grab plate 118 is configured to interface with a rail tie when installed on a rail. To elaborate, stepped surface 206 including a plurality of steps 207 may be in face sharing contact with a rail tie, such as one of the rail ties 110, shown in FIG. 1. The interface between the stepped surfaces in the grab plate and the rail ties prevent rearward movement of the device while derailing operation unfolds. Each of the steps 207 may include a longitudinal face 230 and a vertical face 232 and have a similar size and shape. In one example, a rise 234 of each step may be greater than or equal to about 1 cm (0.4 in) and a run 236 of each step may be about 2 cm (0.8 in). Specifically, in one embodiment the rise of each step may be about 1 cm (0.5 in) and the run of each step may be about 2 cm (1.125 in). When sizing the step's rise and run in this manner, the interface between the grab plate and the rail tie may be made more robust and less susceptible to slipping, shear, etc. However, steps with different sizing and/or contours have been envisioned.

The grab plate 118 may include a cut-out 208 to reduce the weight of the device 100. However, grab plates without cut-outs, differently contoured cutouts, curved surfaces contacting the rail tie may be utilized. Designing the grab plate without a cut-out increases the plate's structural integrity.

The device 100 may specifically include a first peripheral clamping mechanism 210 and a second peripheral clamping mechanism 212. An intermediary clamping mechanism is occluded by the attachment assembly 200, in FIG. 2. Nonetheless, the device 100 may include at least three clamping mechanisms in the embodiment illustrated in FIG. 2. The device may include four or more clamping mechanism, in other embodiments. By increasing the number of clamping mechanisms in the device, the device may be able to derail vehicles traveling at greater speeds, by reducing the chance of the device shifting out of a desirable position during wheel deflection. Specifically, when the device includes three clamping mechanism the device may be able to maintain portability while achieving increased vehicle derailment speeds.

Attachment components 214 (e.g., threaded bolts) included in the first and second peripheral clamping mechanisms 210 and 212, are shown in FIG. 2. The attachment components 214 allow the clamping force exerted by the mechanisms on the track to be varied during installation, for example.

The device 100 is shown including gussets 216 reinforcing the directional derail block 120. However, in other examples, the gussets 216 may not be included in the device 100. A mounting plate 219 may be included in the device 100. The mounting plate 219 allows accessories to be attached to the device such as flags, signs, etc. A support block 221 supporting the derail block may be included in the device. The device 100 is shown including a first clamp block 218 and a second clamp block 220. However, in other examples the clamp blocks may be omitted from the device 100.

The device 100 may be constructed out of one or more metals such as steel and/or aluminum, in some embodiments. To elaborate, material characteristics of the different metals and other suitable materials, such as ceramic materials and polymeric materials, may be taken into account when selecting the material(s) used to construct various constituents of the device. For instance, steel is harder than aluminum. In certain embodiments, the device may be constructed out of steel to increase the device's resistance to wear. However, aluminum has a higher strength to weight ratio than steel. For this reason, the selection of steel to construct the device as opposed to aluminum may come with a weight penalty. Ceramics are harder and stronger in compression in comparison to metals. Therefore, in one embodiment, reinforcing structures experiencing a relatively high amount of compression may be at least partially constructed out of a ceramic material. Titanium may be used to construct certain components in the device, in certain embodiments. However, titanium is costlier than steel and aluminum, and will increase the device's manufacturing cost.

The weight of the device 100 may be less than or equal to about 29 kg (65 lb) in one example. In this way, the device 100 may be portable and carried by a person around the operation environment. However, in other examples, the device may weigh more than about 29 kg (65 lb). In embodiments where the device includes a bi-directional directional derail block configured to derail vehicles traveling in two distinct directions, the device may weigh more than about 29 kg (65 lb).

The device 100 may include an electronic communication device/unit 250 designed to electronically communicate (e.g., wired electronic communication, wireless electronic communication, combinations thereof, etc.) with a remote computing device/unit 252. For example, the electronic communication device/unit 250 may send a derailing device identifier, location data (e.g., geographical position data), clamping sensor data, combinations thereof, etc., to the remote computing device/unit 252. In one embodiment, the device 100 may send installation status data, such as a status of one or more clamps indicating whether the device is fully clamped to a track or not.

The electronic communication device/unit 250 may include a controller 254, a communication component 256 (e.g., antenna), and an energy storage or energy receiving component 258 (e.g., battery, coiled antenna designed to receive radio waves, capacitor, etc.). The electronic communication device/unit 250 may include one or more sensors 260 (e.g., a location sensor such as a Global Positioning System (GPS) sensor, temperature sensor, clamping mechanism sensor, etc.). The clamping mechanism sensor may be designed to sense when the clamping mechanisms are engaged with the track. In some embodiments, the clamping mechanism sensor may be an optical sensor or a pressure sensor. The controller 254 may include memory executable by a processor, in one example. The memory may store instructions that may include at least a portion of the system control techniques, method steps, etc., described herein. In the example, illustrated in FIG. 2, the electronic communication device 250 is positioned adjacent to one of the clamping mechanisms 114. However, in other examples, the electronic communication device/unit 250 may be positioned in another suitable location in the device. For instance, the electronic communication device/unit may be included in an enclosure extending from the base, within the cut-out 208 of the grab plate 118, etc.

In another example, the electronic communication device/unit 250 may include radio-frequency identification (RFID) transponder 262. The RFID transponder may be a passive RFID transponder or an active RFID transponder. For example, the active RFID transponder may include an energy source (e.g., battery, capacitor, etc.) in the communication device/unit. On the other hand, the passive RFID transponder may be energized via an external energy source. For instance, the passive RFID transponder may include a component (e.g., antenna) energized via an external energy source included in an RFID reader, for example. In yet another example, the electronic communication device/unit 250 may include an automatic equipment identification (AEI) tag. In such, an example, the tag may be passive and interface with an AEI system via RF communication.

The remote computing device/unit 252 may include memory 264 storing instructions executable by a processor 266. The instructions may include at least a portion of the system control techniques, method steps, etc., described herein. The memory 264 may include volatile memory, nonvolatile memory, non-transitory memory, dynamic memory, static, read/write memory, read-only memory, random-access memory, sequential-access memory, location-addressable memory, file-addressable memory, content-addressable memory, combinations thereof, etc. Additionally, the processor 266 may be a single-core or multi-core device, and the instructions executed thereon may be configured for sequential, parallel, and/or distributed processing. The remote computing device/unit 252 may include a display device 268. The display device 268 may be used to present a visual representation of data held by the memory 264. The graphics presented on the display device 268 may take the form of a graphical user interface (GUI) and/or other suitable interfaces, for instance. The remote computing device/unit 252 may include an input device 270. The input device 270 may include one or more of a keyboard, mouse, joystick, camera, microphone, touchscreen, and touch pad.

In one example, the remote computing device/unit 252 may be included the vehicle 102 (e.g., railway vehicle). In such an example, the electronic communication device/unit 250 may communicate with a vehicle control system (e.g., railway vehicle control system) in the vehicle 102, shown in FIG. 1.

In another example, the remote computing device/unit 252 may be included in a system 272 such as a vehicle yard management system. For instance, the remote computing device/unit may be included in a control tower in a rail yard. However, numerous suitable operating environments for the remote computing device/unit 252 have been envisioned. Additionally, the device 100 may be included in the system 272. Continuing with the rail yard example, the remote computing device/unit 252 may receive location data from the electronic communication device 250 and display the location of the device in the rail yard in a graphical interface (e.g., yard map). In this way, the location of the device 100 is disseminated to targeted computing devices/units, allowing personnel in the operating environment to be supplied with additional information to more efficiently perform their tasks, manage other personnel in the environment, etc. To elaborate, allowing the device 100 to transmit location and other pertinent data to the remote computing device/unit 252 enables users of the computing device/unit to have increased situational awareness with regard to the operating environment. Consequently, the users can make more informed decisions, related to vehicle travel, which may in some cases increase transportation efficiencies in the operating environment as well as decrease the chance of vehicles traveling into unwanted locations and becoming derailed.

In another example, the remote computing/unit 252 may be a device used by a vehicle network operator. In such an example, the device may be included in a back office system (BOS). However, in other examples, the computing device may be included in a vehicle control system (VCS) (e.g., positive train control (PTC) system). In the VCS system example, the remote computing device/unit 252 may control the vehicle to prevent it from traveling down the track where the device 100 is located. In this way, the chance of the vehicle traveling along an unintended path is reduced.

Figure 3:
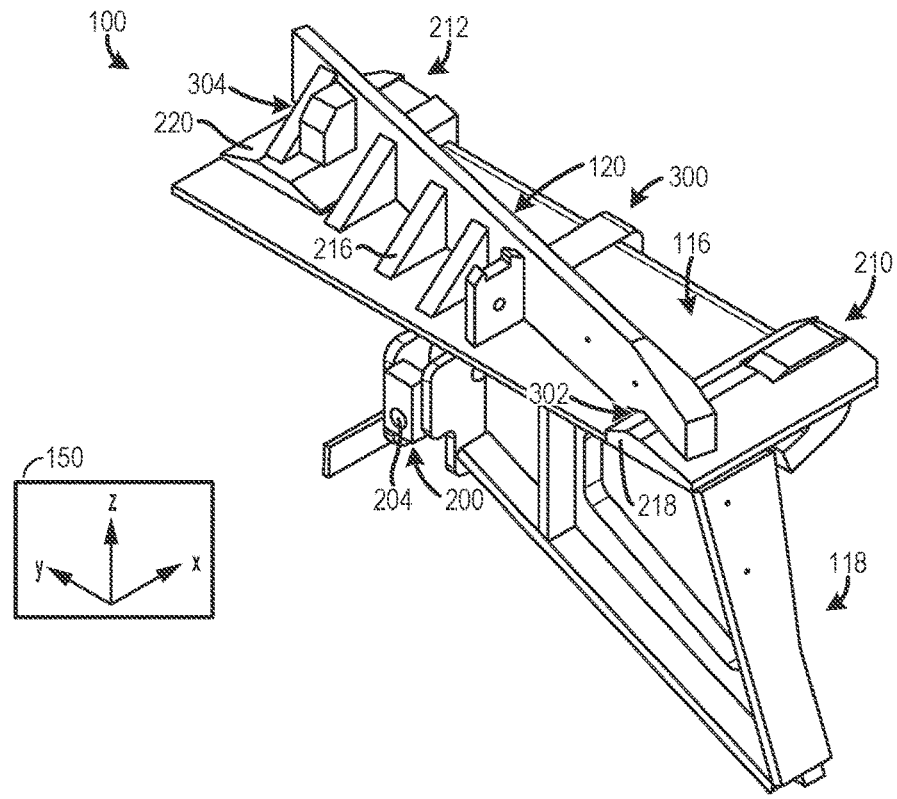
FIG. 3 shows a perspective view of the device, depicted in FIG. 1.

FIG. 3 shows a perspective view of the device 100. The directional derail block 120, base 116, first peripheral clamping mechanism 210, the second peripheral clamping mechanism 212, the gussets 216, the grab plate 118, the first clamp block 218, and the second clamp block 220 are illustrated in FIG. 3. The recess 204 of the attachment assembly 200 into which the attachment component 202, depicted in FIG. 2, threads, is shown in FIG. 3.

An intermediary clamping mechanism 300 is shown in FIG. 3. The intermediary clamping mechanism 300 may function in a similar manner to the first peripheral clamping mechanism 210 and the second peripheral clamping mechanism 212. The directional derail block 120, illustrated in FIG. 3, includes a first peripheral recess 302 mating with the first clamp block 218 and a second peripheral recess 304 mating with the second clamp block 220. However, other directional derail block contours have been envisioned.

Figure 4:
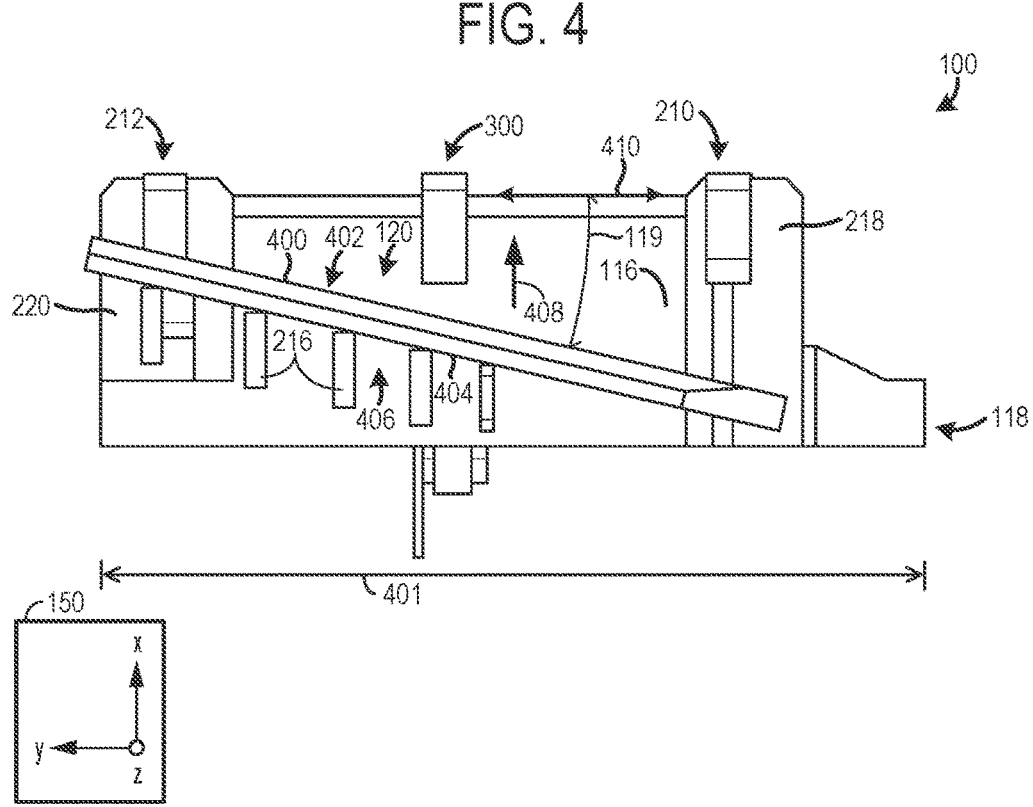
FIG. 4 shows a top view of the device, depicted in FIG. 1.

FIG. 4 shows a top view of the device 100. The directional derail block 120, base 116, first peripheral clamping mechanism 210, second peripheral clamping mechanism 212, the intermediary clamping mechanism 300, the first clamp block 218, the second clamp block 220, the gussets 216, and the grab plate 118, are again shown. The directional derail block 120 includes a wheel deflecting surface 400 on a first side 402 and an outer surface 404 on a second side 406 opposing the first side.

The wheel deflecting surface 400 functions to deflect a wheel of a rail vehicle off of the track. Specifically, the wheel deflecting surface 400 urges the wheel in a lateral direction away from the track, indicated via arrow 408. In this way, the device 100 will push a wheel of a vehicle off of the track. In other examples, the device 100 may be configured to urge the wheel in a direction opposing direction 408.

The wheel deflecting surface 400 forms the angle 119 with the longitudinal axis 410 of a track, such as the longitudinal axis 121 of the first track 104, shown in FIG. 1. In one example, the angle 119 may be less than or equal to about 13 degrees. When the angle 119 is less than or equal to about 13 degrees, the overall length 401 of the device 100 may be greater than or equal to about 53 cm (21 in), in one example. When the device exhibits these length and angular ranges, the device can achieve portability while enabling the device to derail vehicles traveling at higher speeds when compared to devices with derailing blocks with steeper angles. To elaborate, the speed at which the wheel is laterally diverted is decreased, to reduce structural loading on the device 100, thereby reducing the chance of the device shifting, deforming, etc., caused by component loading. Increasing the speed at which a vehicle can travel and be derailed by the device can allow for transportation efficiency gains in the operating environment in which the device is deployed, if desired. For instance, in one use-case example, the speed limit in a railyard or other operating environment in which the device is utilized may be increased. Therefore, cargo, goods, passengers, etc., may be more efficiently moved through the operating environment.

In another example, the angle 119 may be less than or equal to about 10 degrees. When the angle 119 is less than or equal to about 10 degrees the length of the device 100 may further increased. For instance, the overall length 401 may be greater than or equal to about 60 cm (24 in). In yet another example, the angle 119 may be less than or equal to about 9 degrees and the overall length 401 of the device may be even further increased to a length greater than or equal to about 62 cm (24.5 in), in one instance, or within 5% of these values. Decreasing the angular range of the wheel deflecting surface reduces the stress experienced by the device during derailment operation. However, increasing the length of the device may increase the weight of the device. These tradeoff may be taken into account when selecting the angle of the deflecting surface and the device's length.

The first peripheral clamping mechanism 210, the second peripheral clamping mechanism 212, and the intermediary clamping mechanism 300 may laterally extend across the device. Additionally, the gussets 216 may extend laterally across the device 100. However, in other embodiments, different orientations of the clamping mechanisms and/or gussets, may be used.

Figure 5:
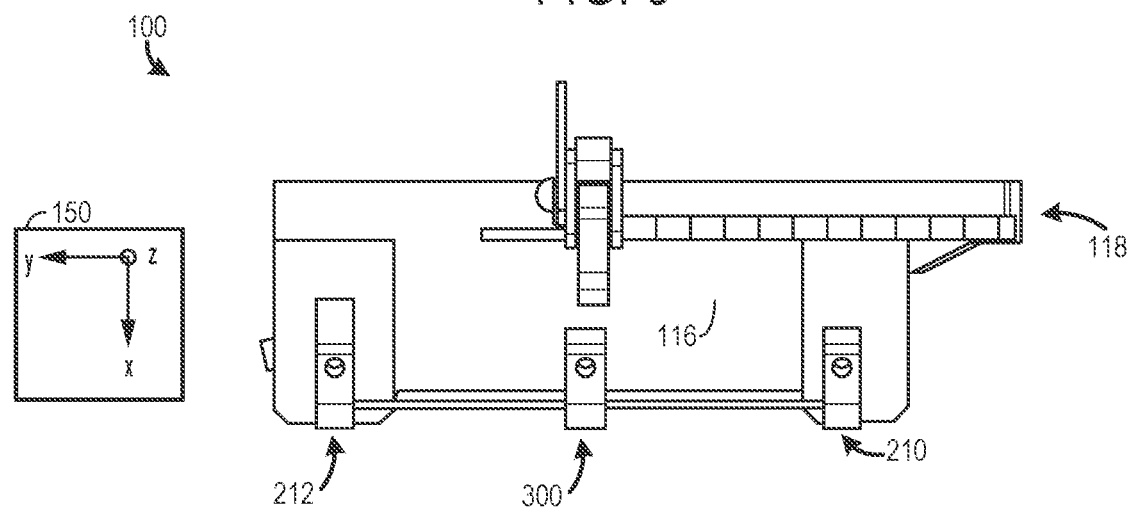
FIG. 5 shows a bottom view of the device, depicted in FIG. 1.

FIG. 5 shows a bottom view of the device 100. The first peripheral clamping mechanism 210, the second peripheral clamping mechanism 212, the intermediary clamping mechanism 300, the base 116, and the grab plate 118, are again illustrated.

Figure 6:
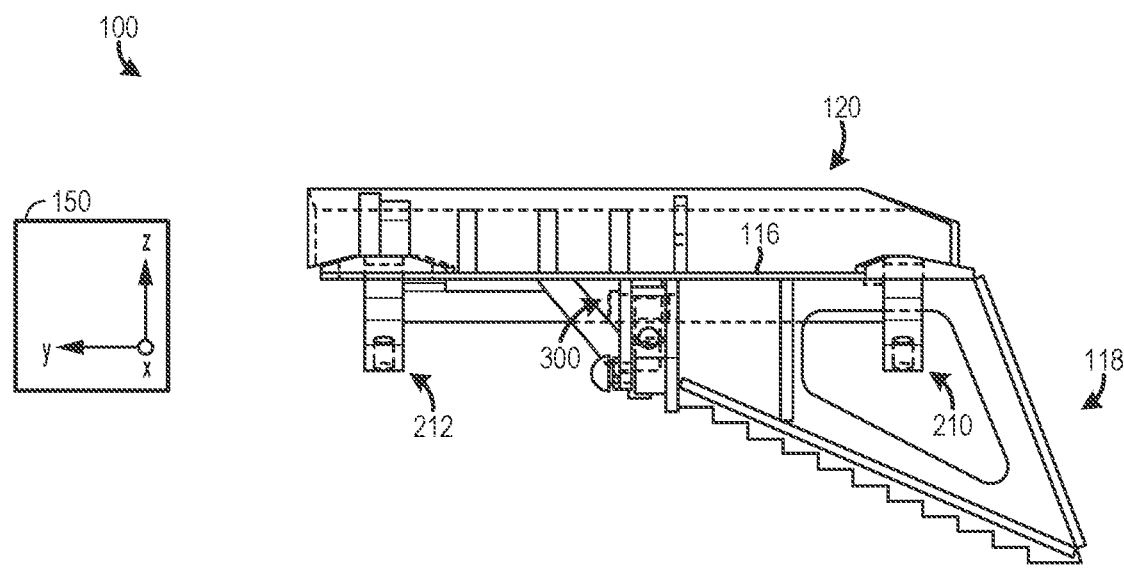
FIG. 6 shows another side view of the device, depicted in FIG. 1.

FIG. 6 shows the device 100 with the directional derail block 120, base 116, grab plate 118, first peripheral clamping mechanism 210, intermediary clamping mechanism 300, and second peripheral clamping mechanism 212.

Figure 7:
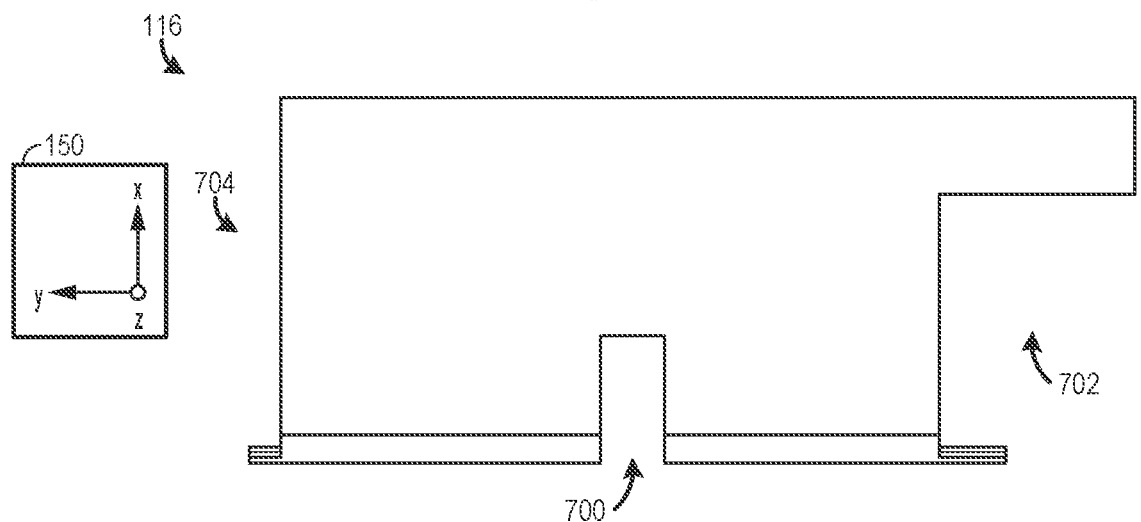
FIG. 7 shows a detailed depiction of a base included in the device, illustrated in FIG. 1.

FIG. 7 shows a detailed illustration of the base 116. The base 116 may include a first recess 700 in which the intermediary clamping mechanism 300, shown in FIG. 3, resides when the device is assembled. The base 116 may include a second recess 702 in which the second clamp block 220 resides when the device is assembled. However, other base contours may be used, in other embodiments. The base 116 may include a front side 704 that may be mechanically coupled or otherwise attached to the first clamp block 218.

Figure 8:
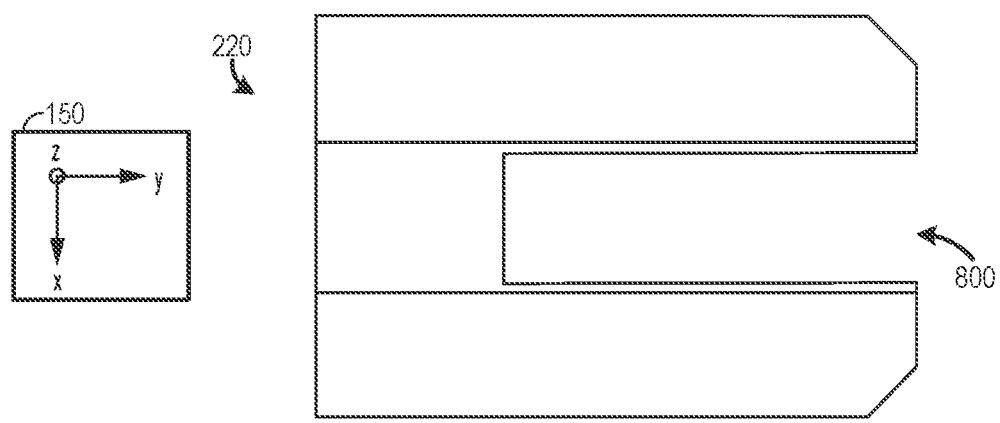
FIGS. 8-9 show different views of a first clamp block in the device, illustrated in FIG. 1.
Figure 9:
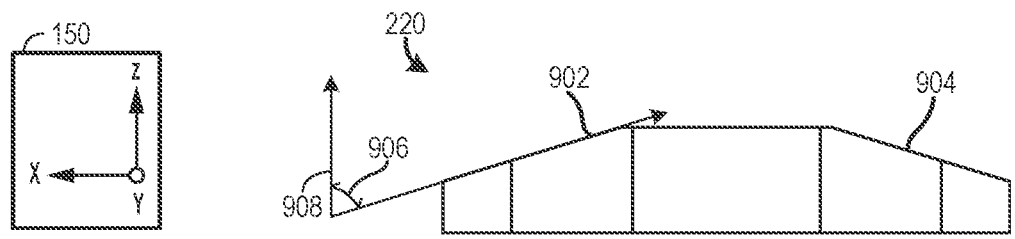

FIG. 8 shows a detailed view of the second clamp block 220. The second clamp block 220 may include a recess 800 mating or otherwise attaching to the second peripheral clamping mechanism 212. FIG. 9 shows a side view of the second clamp block 220. The second clamp block 220 may include a first sloped surface 902 and a second sloped surface 904. An angle 906 of the first sloped surface 902 as measured from a vertical axis 908, is shown in FIG. 9. The angle 906 may be 60 degrees-80 degrees, in one example. Additionally, the sloped surfaces may be equivalent in size and profile, in one example. However, in other examples, the sloped surfaces may vary in size, profile, and/or angular orientation.

Figure 10:
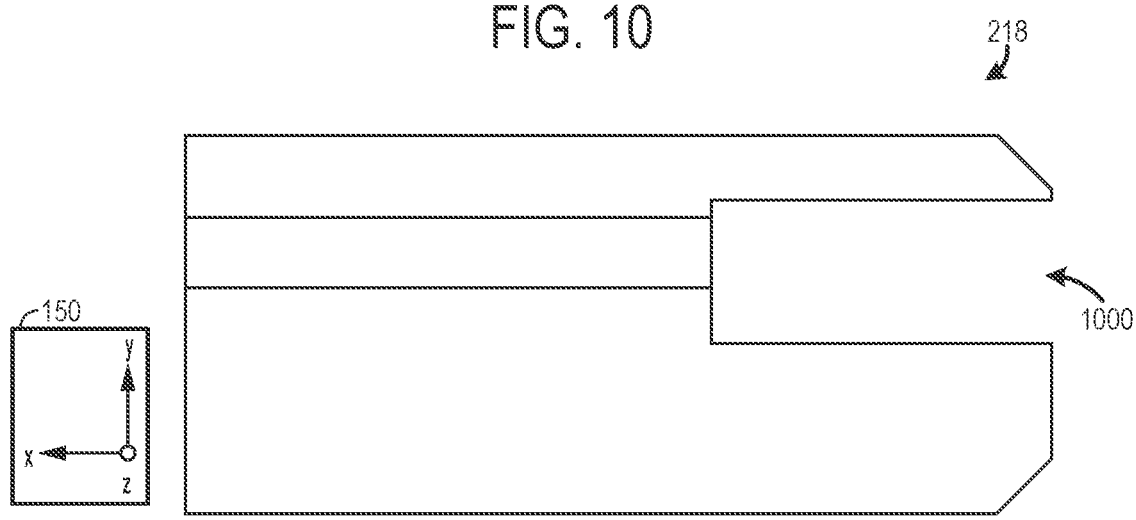
FIGS. 10-11 show different views of a second clamp block in the device, illustrated in FIG. 1.
Figure 11:
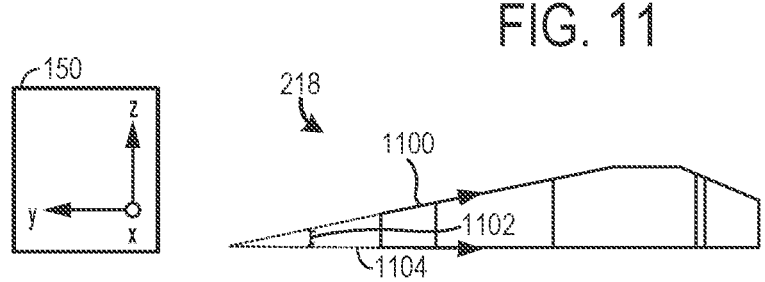

FIG. 10 shows a detailed view of the first clamp block 218. The first clamp block 218 may include a recess 1000 sized to mate or otherwise mechanically couple to the second peripheral clamping mechanism 210, shown in FIG. 2. FIG. 11 shows a side view of the first clamp block 218. The first clamp block 218 may be asymmetric about a vertical axis, in one example. However, other suitable contours of the first clamp block have been envisioned. The first clamp block 218 is shown including a sloped surface 1100. The sloped surface enables the device 100 to smoothly interact with a vehicle wheel during vehicle derailing operation. The sloped surface 1100 is arranged at an angle 1102 with regard to a longitudinal axis 1104. However, in other examples the sloped surface may be omitted from the first clamp block.

Figure 12:
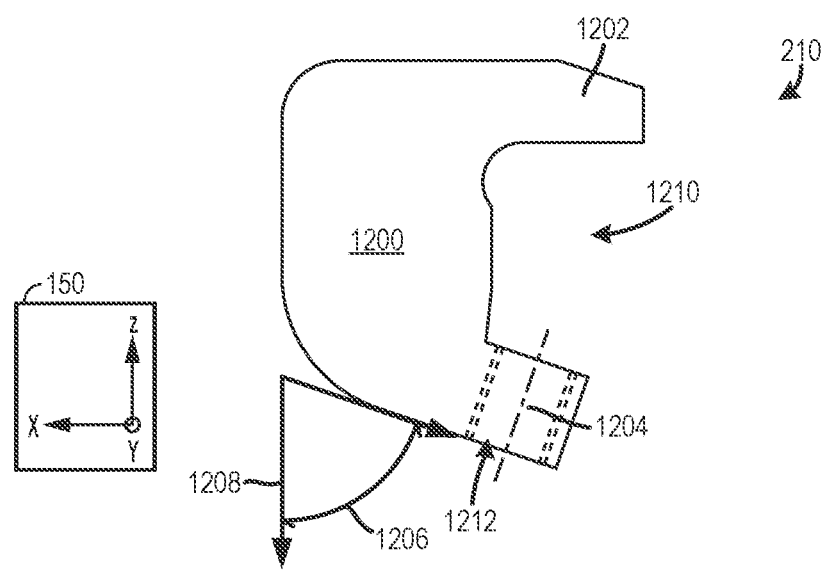
FIG. 12 shows a detailed illustration of a first peripheral clamping block in the device, illustrated in FIG. 1.

FIG. 12 shows a detailed view of the first peripheral clamping mechanism 210. The first peripheral clamping mechanism 210 may include a body 1200 as well as an upper extension 1202 and a lower extension 1204 extending from the body. The lower extension 1204 forms an angle 1206 with regard to a vertical axis 1208. The angle may be between 65-75 degrees, in one embodiment. However, in other embodiments, other angular arrangements of the lower extension 1204 may be used. The first peripheral clamping mechanism 210 may include a recess 1210 between the upper extension 1202 and the lower extension 1204. When installed, a section (e.g., flange) of a track (e.g., rail of the track) extends through the recess 1210. The attachment component 214 (e.g., bolt), shown in FIG. 2, threads into opening 1212 in the lower extension 1204 to allow the clamping force on the track section to be varied.

Figure 13:
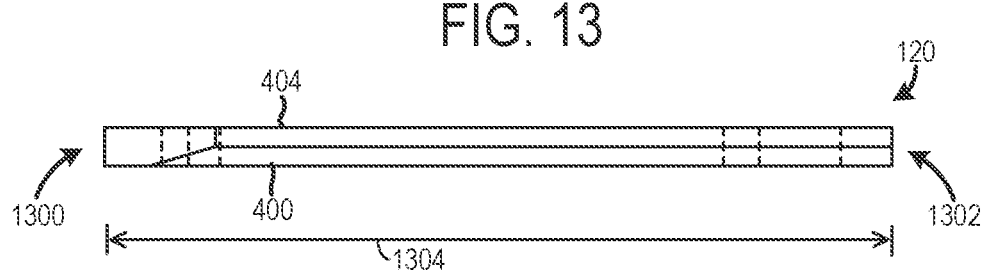
FIGS. 13-15 show different views of a directional derail block included in the device, illustrated in FIG. 1.
Figure 13:
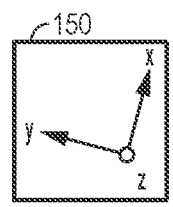
Figure 14:
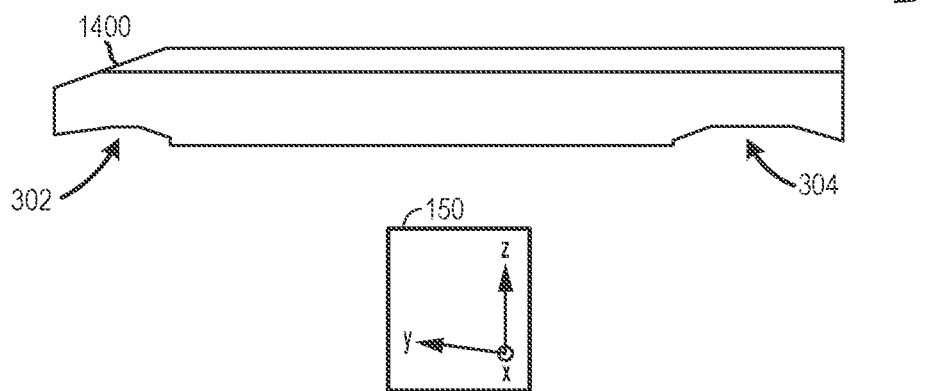
Figure 14:
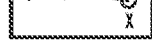
Figure 15:
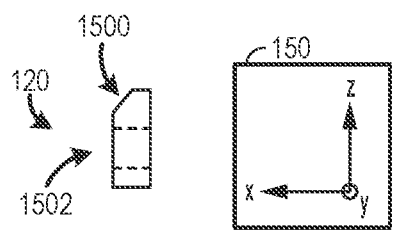

FIGS. 13-15 show different detailed views of the directional derail block 120. Turning specifically to FIG. 13 illustrating a top view of the directional derail block 120. The wheel deflecting surface 400 and the outer surface 404 of the directional derail block 120 are shown. The directional derail block 120 may include a front side 1300 and a rear side 1302. The front side 1300 may initially interact with a vehicle wheel during vehicle derailment. To elaborate, during derailment the directional derail block urges the wheel laterally outwards when the wheel contacts the front side of the directional derail block and until the wheel moves past the rear side of the directional derail block. A length 1304 of the directional derail block 120 is indicated in FIG. 13. In one embodiment, the length 1304 may be greater than or equal to about 53 cm (21 in). In other embodiments, the length 1304 may be greater than or equal to about 53 cm (21.25 in).

FIG. 14 shows a side view of the directional derail block 120. The first peripheral recess 302 and the second peripheral recess 304 are illustrated in FIG. 14. When assembled the first clamp block 218, shown in FIG. 2, and the second clamp block 220, shown in FIG. 2, may be positioned in the first peripheral recess 302 and the second peripheral recess 304, respectively.

The directional derail block 120 includes a leading surface 1400 sloping downward with regard to the vertical axis. However, other shapes of the directional derail block may be used. Sloping the leading surface of the block downward may decrease the weight of the device by decreasing the profile of the device. The leading surface may have a non-sloping contour, in other embodiments.

FIG. 15 shows a front view of the directional derail block 120. The directional derail block 120 may include a tapered top section 1500. The tapered top section 1500 allows the directional derail block to smoothly interact with the vehicle wheel during derailment. However, in other examples, the thickness of the top section may not substantially vary. The directional derail block 120 may include a lower section 1502. The lateral thickness of the lower section 1502 may be substantially constant. However, other suitable contours of the lower section may be utilized, in other embodiments, such as curved contours or tapered contours.

Figure 16:
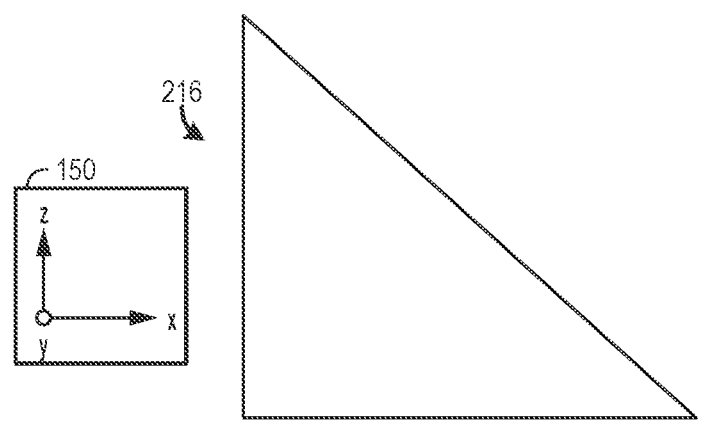
FIG. 16 shows a detailed view of a gusset in the device, illustrated in FIG. 1.

FIG. 16 shows a detailed view of one of the gussets 216. The gusset shown in FIG. 16 may have a similar size and profile to the other gussets included in the device. The gusset 216 may have a triangular shape, in one example. Other gusset shapes may be used in alternate embodiments such as rectangular shapes, semi-circular shapes, etc.

Figure 17:
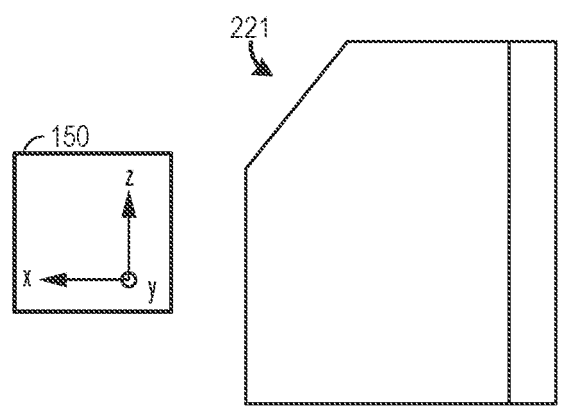
FIG. 17 shows a detailed view of a support block in the device, illustrated in FIG. 1.

FIG. 17 shows a detailed view of the support block 221. The support block 221 may be coupled to the directional derail block 120, shown in FIG. 2.

Figure 18:
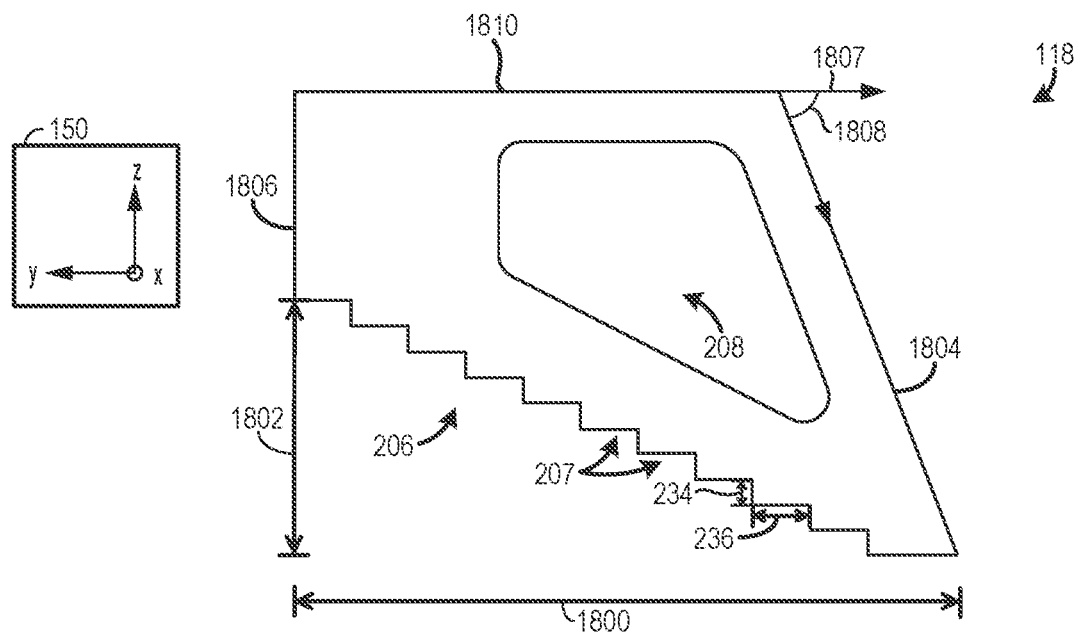
FIG. 18 shows a detailed view of a grab plate in the device, illustrated in FIG. 1.

FIG. 18 shows a detailed view of a grab plate 118. As previously described, the grab plate 118 may include stepped surface 206 with steps 207 interacting with rail ties when the device is installed. The rise 234 and the run 236 of the steps 207 are indicated.

A longitudinal length 1800 and height 1802 of the stepped surface 206 is indicated in FIG. 18. In one example, the longitudinal length may be greater than about 25 cm (10 in)

(e.g., 27 cm (11 in), 30 cm (12 in), 33 cm (13 in), etc.). In another example, the height 1802 may be greater than or equal to about 10 cm (4 in).

The cut-out 208 in the grab plate is again shown. A leading surface 1804 may be included in the grab plate 118. An angle 1808 of the leading surface with regard to a longitudinal axis 1807 is indicated in FIG. 18. The angle 1808 may be between 60 degrees and 80 degrees, in some embodiments.

The grab plate 118 may have a trailing surface 1806. The trailing surface 1806 may be adjacent to the attachment assembly 200, shown in FIG. 2, when the device is assembled. An upper surface 1810 of the grab plate 118 is adjacent to the base 116, shown in FIG. 2, when the device is assembled. The grab plate 118 may be attached (e.g., welded, mechanically coupled, combinations thereof, etc.) to the base 116.

Figure 19:
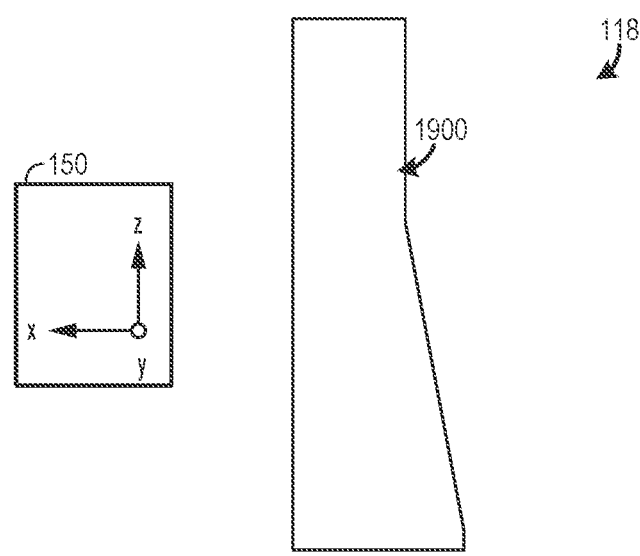
FIG. 19 shows a front view of the grab plate in the device, illustrated in FIG. 1.

FIG. 19 shows a front view of the grab plate 118. Specifically, a front section 1900 of the plate is illustrated.

Figure 20:
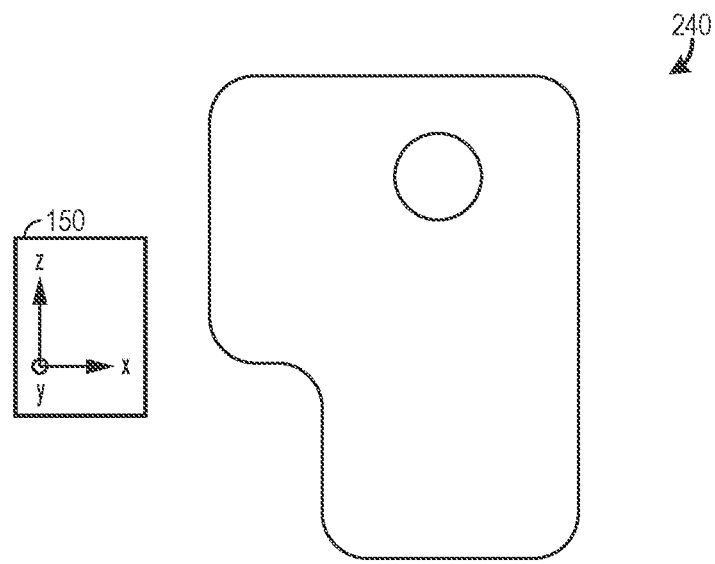
FIG. 20 shows a detailed view of a first lock support plate in the device, illustrated in FIG. 1.
Figure 21:
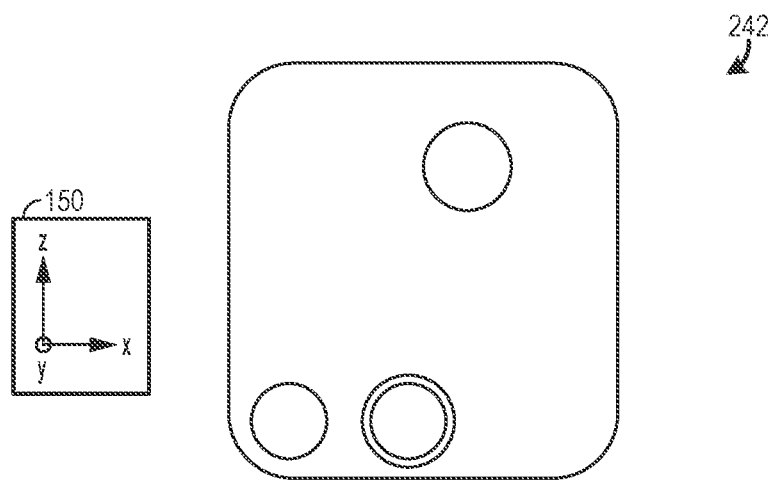
FIG. 21 shows a detailed view of a second lock support plate in the device, illustrated in FIG. 1.

FIG. 20 shows a detailed view of the first lock support plate 240 positioned on one side (e.g., a leading side) of the attachment assembly 200, shown in FIG. 2. A second lock support plate 242, shown in FIG. 21, may be positioned on the other side of the attachment assembly 200, shown in FIG. 2. As described herein, leading and trailing descriptors are indicated with regard to the direction of travel of the vehicle along the track. Thus, the leading portions of the components may initially interact or otherwise be adjacent to the vehicle wheel during derailment.

Figure 22:
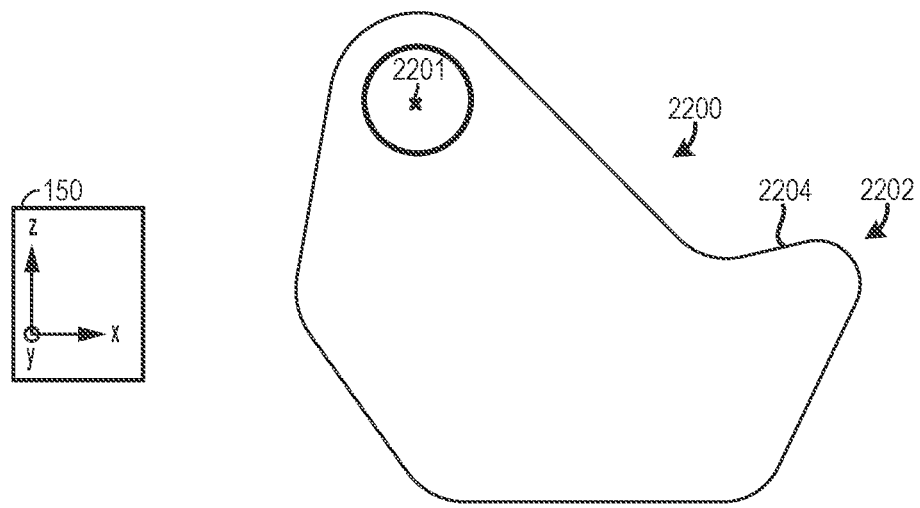
FIG. 22 shows a detailed view of a lock block in the device, illustrated in FIG. 1.

FIG. 22 shows a detailed view of a lock block 2200 that may be included in the attachment assembly 200, shown in FIG. 2. The lock block 2200 allows the device to be attached to rails having different dimensions (e.g., widths). To elaborate, the attachment component 202, shown in FIG. 2, may be threaded and unthreaded to induce adjustment of the orientation (e.g., angular position) of the lock block 2200. Thus, the lock block 2200 may pivot about axis 2201 during said adjustment. The lock block 2200 may include a protrusion 2202 and a surface 2204 engaging a portion of the track, when the device is installed. The lock block 2200 engages with a side of the rail opposing the side of the rail clamped by the clamping mechanisms.

Figure 23:
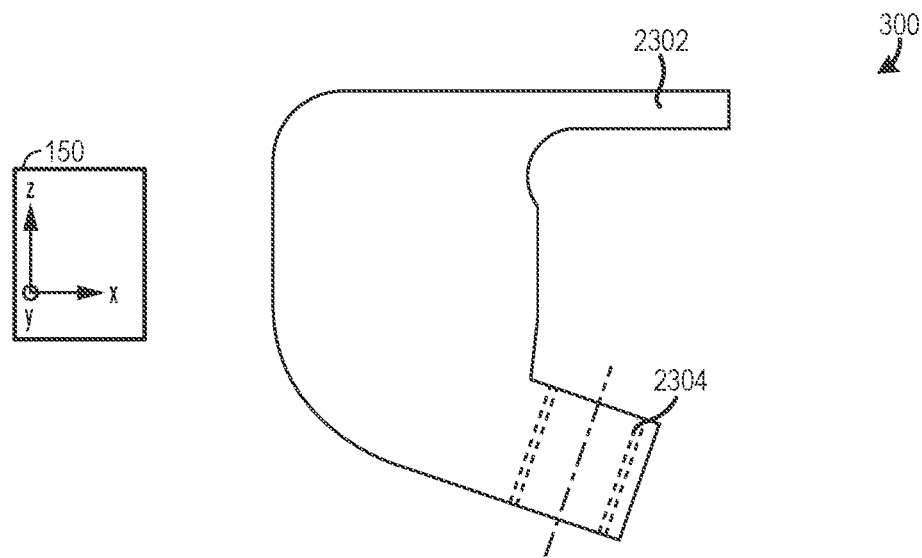
FIG. 23 shows a detailed view of an intermediary clamping mechanism in the device, illustrated in FIG. 1.

FIG. 23 shows a detailed view of the intermediary clamping mechanism 300. The clamping mechanism 300 may include an upper clamping arm 2302 and a lower clamping arm 2304.

Figure 24:
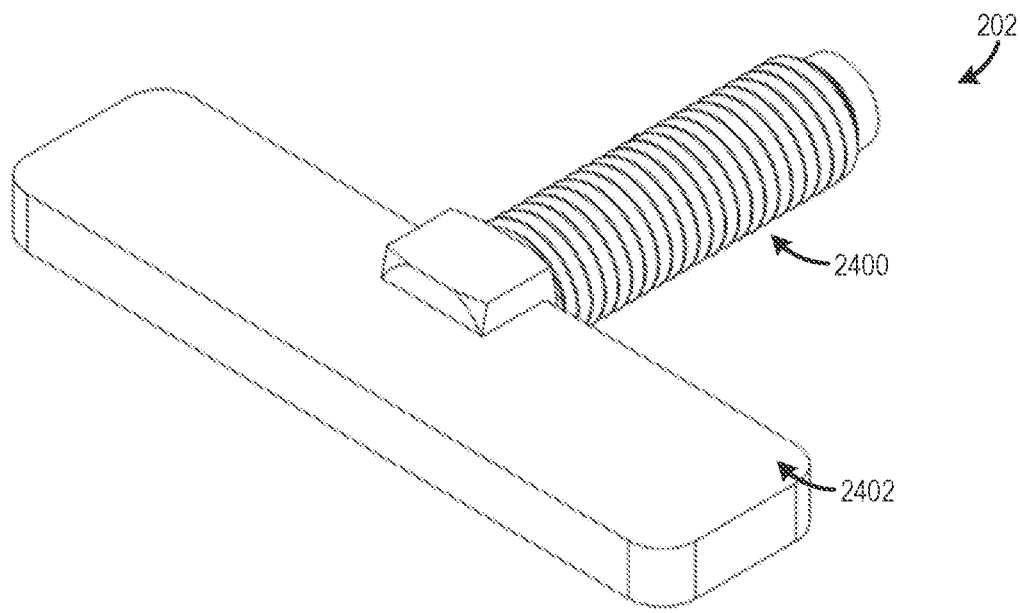
FIGS. 24 and 25 show different attachment components included in the device, illustrated in FIG. 1.

FIG. 24 shows a detailed view of the attachment component 202 (e.g., threaded bolt) that may be included in the attachment assembly 200, shown in FIG. 2. The attachment component may include a threaded portion 2400 extending from a head 2402. As previously discussed, the attachment component 202 may be threaded into the lock block 2200 to enable the clamping orientation of the lock block to be varied to accommodate for variances in track profile (e.g., width).

Figure 25:
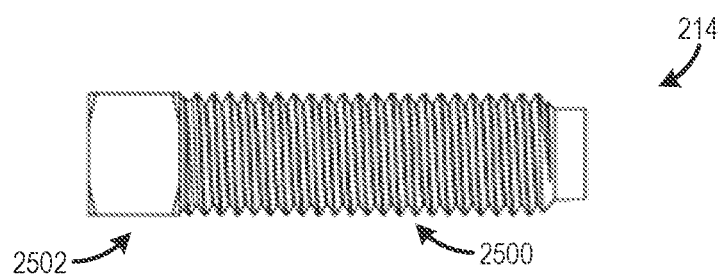

FIG. 25 shows a detailed view of the attachment component 214. The attachment component 214 may include a threaded portion 2500 extending from a head 2502. The attachment component 214 may be used to adjust the clamping force applied by any of the first peripheral clamping mechanism 210, the second peripheral clamping mechanism 212, and the intermediary clamping mechanism 300, shown in FIG. 3. To elaborate, threading and unthreading the component 214 into and out of threaded openings in the mechanisms allows the clamping force applied to the track by the attachment component to be varied. In this way, the device may be securely clamped to the track.

Figure 26:
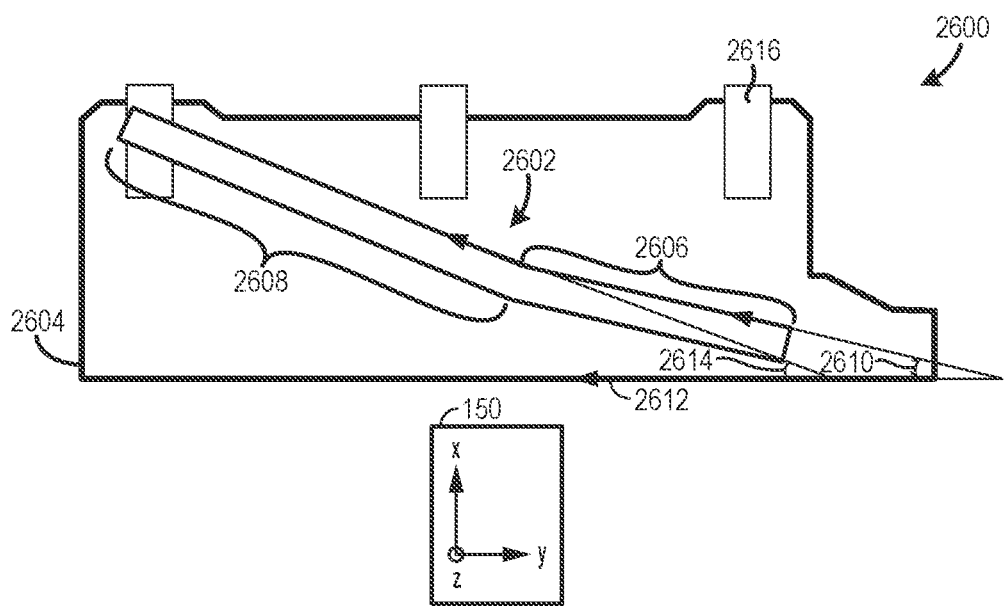
FIG. 26 shows a top view of a second embodiment of a device.

FIG. 26 illustrates a second embodiment of a device 2600. The second embodiment of the device 2600 as well as the other device embodiments described herein may include similar components, functionalities, sizing, profiles, etc., to the first embodiment of the device 100 shown in FIGS. 1-25. As such, redundant description is omitted for brevity.

The device 2600 includes a directional derail block 2602 extending from and coupled to a base 2604. In other embodiments, the directional derail block 2602 may include a first section 2606 and a second section 2608. The first section 2606 is arranged at a first angle 2610 with regard to a longitudinal axis 2612 of the track on which the device is placed. The second section 2608 is arranged at a second angle 2614 with regard to the longitudinal axis 2612. As shown, the first angle 2610 is less than the second angle 2614. The first section 2606 is arranged at angle with regard to the second section 2608. In this way, during use of the device the wheel deflection angle gradually increases to progressively load the directional derail block during derailing operation. Designing the directional derail block deflecting surfaces which sequentially increase in angle allows longer throw in a shorter run, and therefore allows weight reductions to be achieved, if desired, when compared to derailing devices having a derail block arranged at one angle along its length. Additionally, the device 2600 is shown including clamping mechanisms 2616.

In another embodiment, the wheel deflecting surface in the directional derail block may be convexly curved and are away from the track. In the curved wheel deflecting surface embodiment, a leading section of the surface may be arranged parallel to the longitudinal axis of the track. Consequently, the load on the derailing block may be gradually increased while vehicle derailing occurs, thereby reducing the likelihood of device degradation caused by intensified loading.

In yet another embodiment, one of the wheel deflecting surfaces may be curved while another wheel deflecting surface may be planar. In this way, the loading of the device occurring during vehicle derailment may be more finely tuned to enable loads to be distributed in a desired manner during vehicle derailment.

Figure 27:
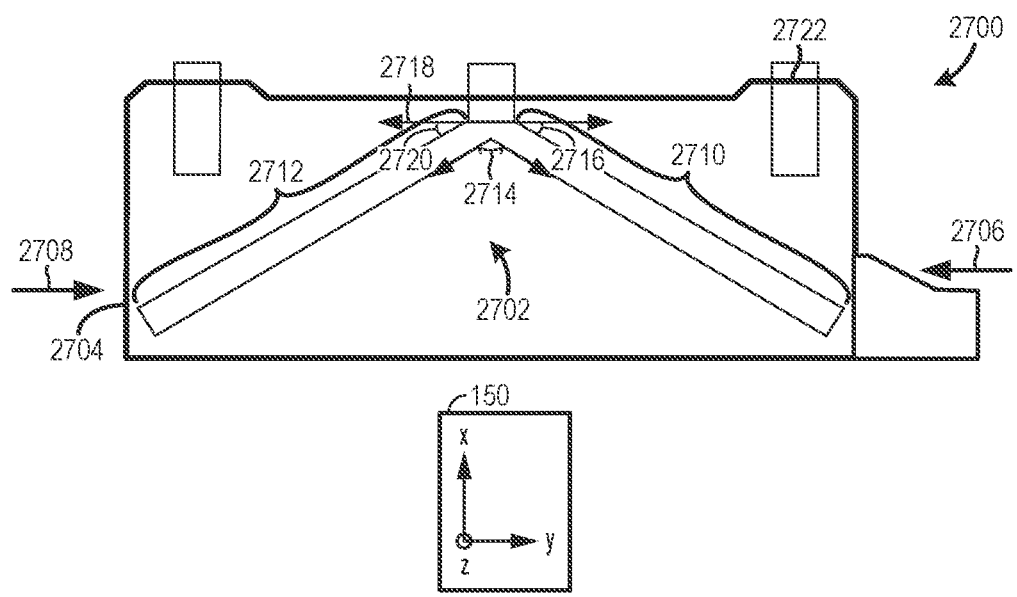
FIG. 27 shows a top view of a third embodiment of a device.

FIG. 27 shows a third embodiment of a device 2700. The device 2700 includes a directional derail block 2702 extending from and coupled to a base 2704. However, the directional derail block 2702 shown in FIG. 27 is bi-directional. As such, the directional derail block 2702 functions to derail wheels traveling in a first direction 2706 along a track and a second direction 2708 along the track opposing the first direction. In this way, the device's applicability is increased. However, the bi-directional derail block may increase the weight of the device, thereby decreasing the device's portability.

To accomplish the bi-directional derailment functionality the derail block 2702 includes a first section 2710 and a second section 2712. However, in another example, the first and second block sections may form a first derail block and a second derail block. In such an example, the first derail block may be disposed adjacent to the second derail block.

The first section 2710 is arranged at an angle 2714 with regard to the second section 2712. Further in one example, the first section 2710 may have a substantially equivalent size and shape to the second section 1712. However in other examples, the first section 2710 and the second section 2712 may vary in size and/or shape.

The first section 2710 is arranged at an angle 2716 with regard to a longitudinal axis 2718. Correspondingly, the second section 2712 is arranged at an angle 2720 with regard to the longitudinal axis 2718. The angle 2716 may be less than or equal to about 13 degrees, in one embodiment. Likewise, the angle 2720 may be less than or equal to about 13 degrees, in one example.

The device 2700 is shown including clamping mechanisms 2722. The device shown in FIG. 27 may include two grab plates to inhibit movement of the devices during wheel derailment in either direction. To elaborate, in such an example, the grab plates may be oriented in opposing directions.

Figure 28:
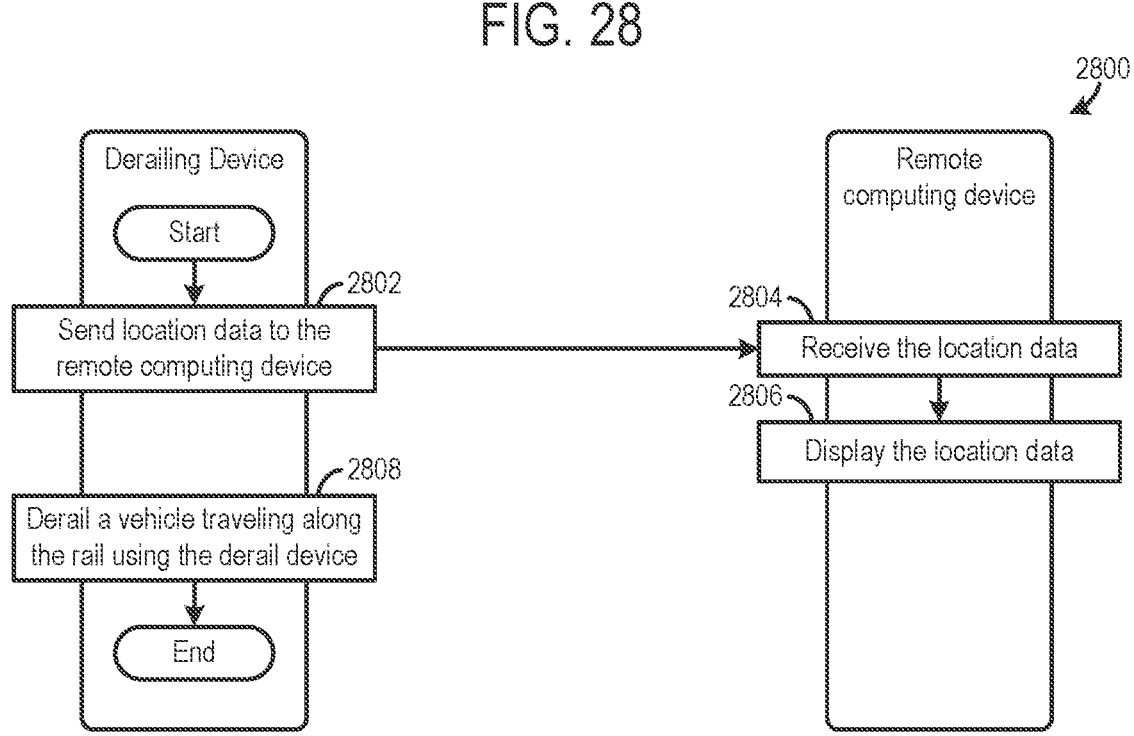
FIG. 28 shows a method implemented in a system including a derailing device.

FIG. 28 shows a method 2800 for operation of a system. The method 2800 is shown implemented via a derailing device and a remote computing device. The derailing device and remote computing device shown in FIG. 28 may be included in any of the systems described above with regard to FIGS. 1-27, in one example. However, in other examples, the derailing device and remote computing device, shown in FIG. 28 may be included in other suitable systems. At least a portion of the method steps may be implemented as instructions stored in non-transitory memory executable by a processor. However, some of the method steps may be passively implemented.

At 2802 the method includes sending location data from the device to a remote computing device. For instance, the derailing device may actively send data at predetermined time intervals via wired and/or wireless communication to the remote computing device. Sensor data (e.g., clamping sensor data) may be sent in addition or as an alternative to the location data. The remote computing device, in one example, may be included in vehicle. However, in another example, the remote computing device may be included in a railyard management system. In other examples, the derailing device may be a passive device that is energized by an RFID scanner, for example.

Next at 2804 the method includes receiving the location data at the remote computing device. At 2806 the method includes displaying the location data. For instance, the location data may be presented in a display in a vehicle. In other examples, the location data may trigger an alert (e.g., audio, visual, haptic, combinations thereof, etc.) corresponding to the location of the derailing device. For instance, a vehicle operator may be alerted that the vehicle is traveling towards the derailing device. In other examples, the derailing device's location may be presented on a map of a railway yard in a control tower. In this way, the vehicle operator, railyard personnel, etc., may be made aware of the location of the derailing device. In yet another example, the remote computing device may be included in the vehicle and the vehicle may adjust its speed via an engine, motor, and/or braking systems when it is determined the vehicle is on a path expected to encounter the derailing device. For instance, the vehicle may increase braking and decrease engine output when it is determined that the vehicle is anticipated to interact with the derailing device.

At 2808 the method includes derailing a vehicle traveling along the track where the derailing device is attached. To elaborate, a wheel of the vehicle may be deflected off the track via the directional derail block included in the derailing device at step 2808. The device may derail a vehicle traveling at relatively high speeds such as speeds greater than or equal to about 24 km/h (15 mph). By derailing a vehicle traveling at relatively high speeds, the devices capabilities are expanded, increasing device adaptability.

Method 2800 allows the device to transmit location data to a remote computing device. As a result, users of the remote computing device are provided with pertinent information related to locations of derailing devices in the operating environment in which the derailing device is deployed.

In any of the embodiments herein, the derailing device may be configured, based on wheel deflecting surface angle, number of clamping mechanisms, overall length, and/or stepped grab plate, etc., to derail a single rail vehicle (i) having metal (e.g., steel) conical wheels that engage the rail track and (ii) that has a kinetic energy of 2700 kJ (kilo-Joules) at the time the rail vehicle, traveling along the track, comes into physical contact with the derailing device. This reflects, for example, a rail vehicle traveling at 6.7 meters per second (m/s) (15 mph) and having a mass of 120000 kg (approximately 135 US tons).

In one aspect, the overall length of a device as set forth herein may be defined as the longest dimension of the device along the direction of the track axis when the device is attached to the track for use, and/or relative to structural components of the device that would bear forces generated by a vehicle encountering the device for derailment (e.g., it would exclude components like a sensor wire attached to the device, or a mast/flag or other elongate indicia used to show personnel where the device is positioned).

In any of the embodiments herein, the derailing device may be configured, based on wheel deflecting surface angle, number of clamping mechanisms, overall length, and/or stepped grab plate, etc., to derail a single rail vehicle (i) having metal (e.g., steel) conical wheels that engage the rail track and (ii) that has a kinetic energy of 4000 kilo-Joules (kJ) at the time the rail vehicle, traveling along the track, comes into physical contact with the derailing device. This reflects, for example, a rail vehicle traveling at 6.7 m/s (15 mph) and having a mass of 175000 kg (approximately 190 US tons).

In any of the embodiments herein, the derailing device may be configured, based on wheel deflecting surface angle, number of clamping mechanisms, overall length, and/or stepped grab plate, etc., to derail a single rail vehicle (i) having metal (e.g., steel) conical wheels that engage the rail track, (ii) that is traveling at 6.7 m/s (15 mph) at the time the vehicle comes into physical contact with the derailing device, and (iii) having a mass of from 175000 to 180000 kg (approximately 190 to 198 US tons). In any of the embodiments herein, the derailing device may be configured, based on wheel deflecting surface angle, number of clamping mechanisms, overall length, and/or stepped grab plate, etc., to derail a single rail vehicle (i) having metal (e.g., steel) conical wheels that engage the rail track and (ii) that has a kinetic energy of 2700 kJ at the time the rail vehicle, traveling along the track, comes into physical contact with the derailing device. This reflects, for example, a rail vehicle traveling at 6.7 m/s (15 mph) and having a mass of 120000 kg (approximately 135 US tons).

In any of the embodiments herein, the derailing device may be configured, based on wheel deflecting surface angle, number of clamping mechanisms, overall length, and/or stepped grab plate, etc., to derail a single rail vehicle (i) having metal (e.g., steel) conical wheels that engage the rail track and (ii) that has a kinetic energy of 4000 kJ at the time the rail vehicle, traveling along the track, comes into physical contact with the derailing device. This reflects, for example, a rail vehicle traveling at 6.7 m/s (15 mph) and having a mass of 175000 kg (approximately 190 US tons).

In an embodiment, a device (e.g., a derailing device) includes a derail block extending from a base and including a wheel deflecting surface. The device also includes plural clamping mechanisms positioned along the derail block and configured to engage with a rail of a track. The wheel deflecting surface is configured to be arranged at an angle with regard to a longitudinal axis of the track when the device is attached to the track and is configured to deflect a wheel of a vehicle away from and off the track. The device has one or more of the following characteristics: there are three of the clamping mechanisms; an overall length of the device is greater than or equal to about 53 cm (21 in); the device includes a grab plate coupled to the base and including a plurality of steps, where each of the plurality steps has a rise greater than or equal to about 1 cm (0.4 in) and a run greater than or equal to about 2 cm (0.8 in); the angle is less than or equal to 13 degrees; and/or a weight of the device is less than or equal to about 29 kg (65 lb).

In another embodiment, a device (e.g., a derailing device) includes a derail block extending from a base and including a wheel deflecting surface. The device also includes plural clamping mechanisms positioned along the derail block and configured to engage with a rail of a track. The wheel deflecting surface is configured to be arranged at an angle with regard to a longitudinal axis of the track when the device is attached to the track and is configured to deflect a wheel of a vehicle away from and off the track. The device also has all the following characteristics: there are three of the clamping mechanisms; an overall length of the device is greater than or equal to about 53 cm (21 in); the device includes a grab plate coupled to the base and including a plurality of steps, where each of the plurality steps has a rise greater than or equal to about 1 cm (0.4 in) and a run greater than or equal to about 2 cm (0.8 in); the angle is less than or equal to 13 degrees; and a weight of the device is less than or equal to about 29 kg (65 lb).

In an embodiment, a derailer system includes a derailer device and an electronic communication unit. The derailer device includes a first derail block extending from a base and including a wheel deflecting surface. The wheel deflecting surface is configured to be arranged at a first angle relative to a longitudinal axis of a track when the derailer device is attached to the track and configured to deflect a wheel of a vehicle away from and off the track. The derailer device also includes plural clamping mechanisms positioned along the base and configured to engage with a rail of the track on a side of the track opposite the wheel deflecting surface and toward which the wheel is deflected by the wheel deflecting surface. The electronic communication unit is configured for attachment to the derailer device and is configured to communicate at least one of location data of the derailer device and/or installation status data of the derailer device to a remote computing unit.

Figure 29:
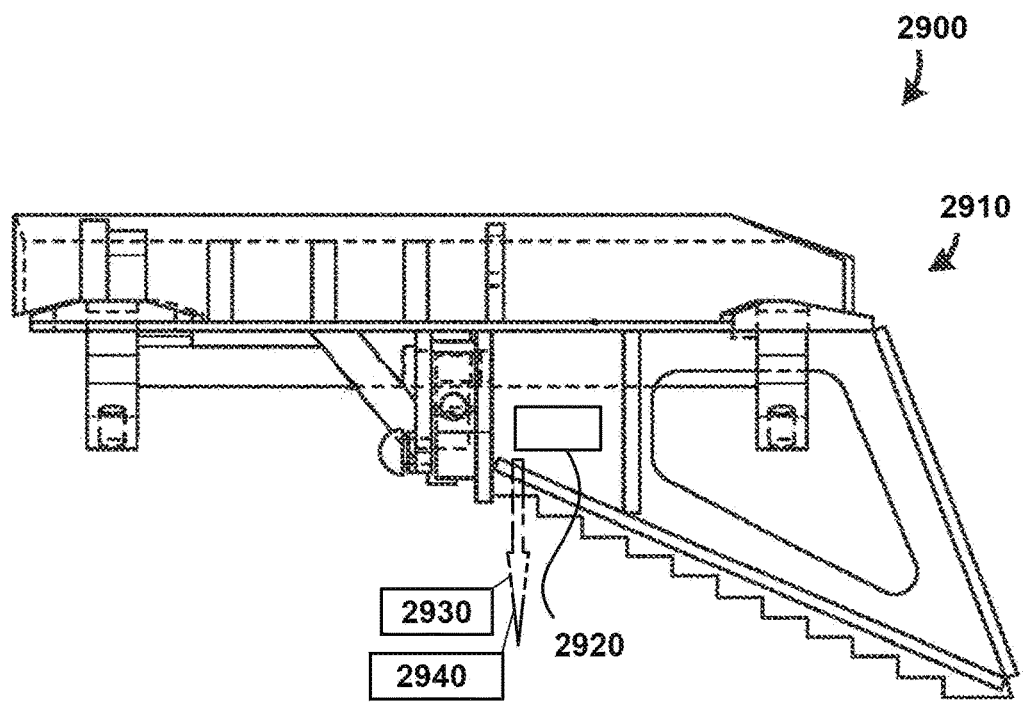
FIG. 29 is a side view, partially in schematic, of an embodiment of a derailer system.

Turning to FIG. 29, an embodiment of a derailer system 2900 includes a derailer device 2910 and an electronic communication unit 2920. The derailer device may include, or be similar to, any of the derailer devices 100, 2600, etc. described herein, or it may be configured in another manner. Generally, the derailer device may include a first derail block extending from a base and including a wheel deflecting surface. The wheel deflecting surface is configured to be arranged at a first angle relative to a longitudinal axis of a track when the derailer device is attached to the track and is configured to deflect a wheel of a vehicle away from and off the track. The derailer device also includes plural clamping mechanisms (e.g., two, three, or more than three) positioned along the base and configured to engage with a rail of the track on a side of the track opposite the wheel deflecting surface and toward which the wheel is deflected by the wheel deflecting surface. (See FIGS. 1-28 and related description for various examples.) The electronic communication unit is configured for attachment to the derailer device, and is also configured to communicate at least one of location data 2930 of the derailer device and/or installation status data 2940 of the derailer device to a remote computing unit. In one embodiment, the electronic communication unit is configured to communicate both the location data and the installation status data to the remote computing unit.

Figure 30:
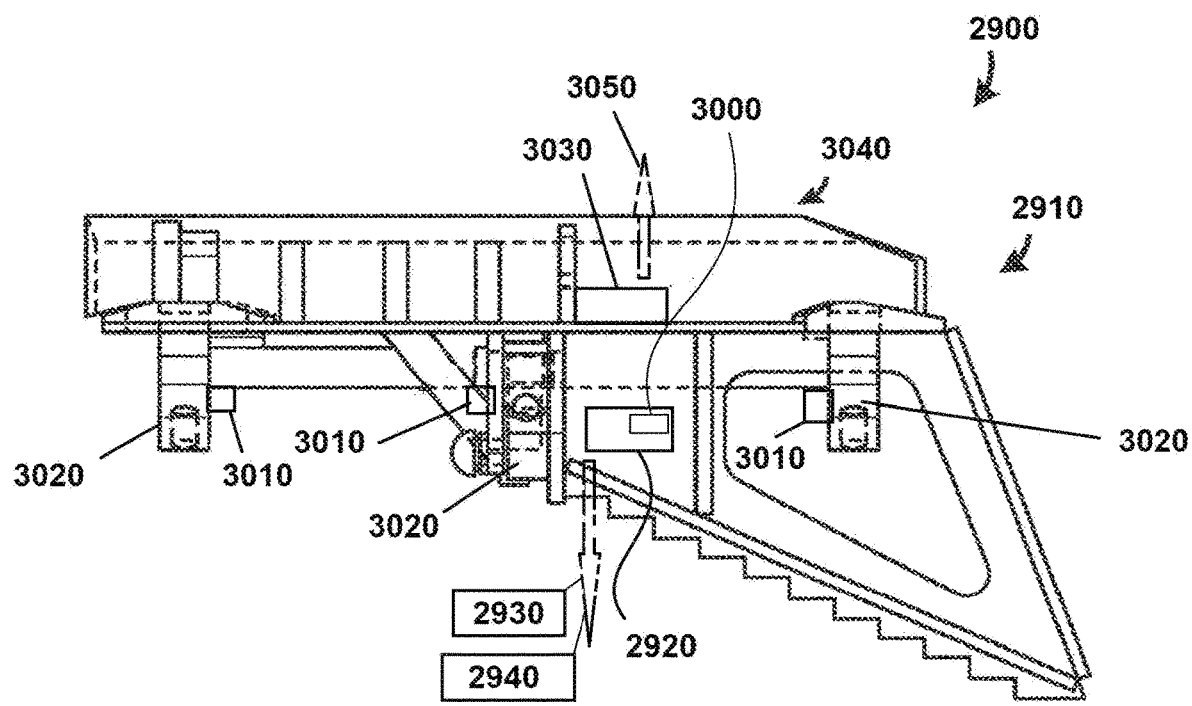
FIG. 30 is a side view, partially in schematic, of another embodiment of a derailer system.

In another embodiment, with reference to FIG. 30, the electronic communication unit may further include a GPS sensor 3000 configured to generate the location data. The location data may include a determined geographic location of the derailer device, e.g., an absolute location, and/or a location relative to a track network map or other transportation or infrastructure map or data. The electronic communication unit also includes plural clamping mechanism sensors 3010 configured to sense respective clamping statuses of the plural clamping mechanisms 3020. For example, whether a clamping mechanism is fully clamped against a rail, loosely clamped against a rail, or not clamped against a rail at all. The installation status data includes data of the clamping statuses. Examples of possible clamping mechanism sensors include force sensors and optical sensors, and also switches that are configured to be thrown from an open state to a closed state (or vice versa) when a clamping mechanism is at a position corresponding to being fully clamped (based on the clamping mechanism configuration relative to known characteristics of the rail).

In another embodiment, the electronic communication unit may also include one or more derail block sensors 3030 operably coupled to the derail block 3040 (of the derailer device) at respective locations and configured to generate respective derailing data 3050 indicative of sensing a wheel being deflected by the wheel deflecting surface (i.e., a derailing event). The electronic communication unit is further configured to communicate the derailing data to the remote computing unit. In one aspect, the unit includes only one derail block sensor. In other aspect, the unit may include two (or more than two) derail block sensors. In such an embodiment, the remote computing unit may compare the respective derailing data from plural derail block sensors to verify or determine a derailing event. For example, the computing unit may be configured to determine a derailing event if both sensors concurrently generate data indicative of a derailing event (concurrently meaning within a relatively short time window), but not if neither sensor generates data indicative of a derailing event, or not if one, but not both, of the sensors generates data indicative of a derailing event. The system may be configured so that upon determining a derailing event, the system automatically schedules a work crew to investigate and take action if needed, and/or logs safety-related data, and/or confirms ground crew safety status, etc.

Figure 31:
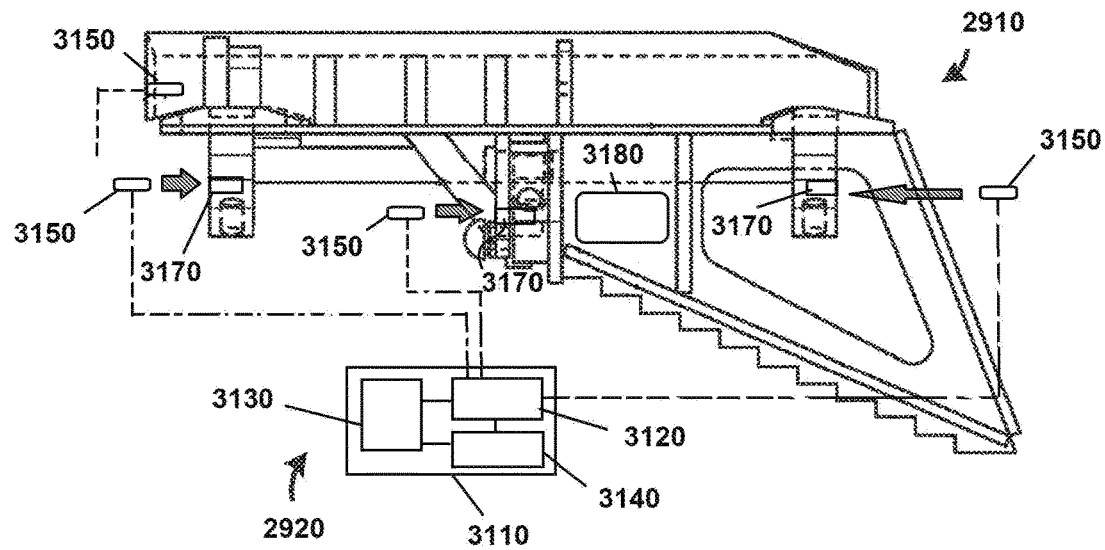
FIG. 31 is a side view, partially in schematic, of another embodiment of a derailer system.

In another embodiment, with reference to FIG. 31, the electronic communication unit 2920 (e.g., part of a derailer system described herein) includes a housing 3110, a controller circuit 3120, a communication component 3130, and an energy storage device 3140 all at least partially housed in the housing. (In FIG. 31, the unit 2920 is not necessarily shown to scale.) The communication unit also includes plural sensors 3150 configured to generate data, e.g., installation status data and/or derailing data. The plural sensors are positioned outside the housing and configured to communicate with the controller circuit, e.g., over wired or wireless connection(s). The derailer device 2910 includes plural sensor ports 3170 configured to respectively receive one or more of the plural sensors at plural respective locations of the derailer device, for the plural sensors to generate the installation status data, and/or the derailing data, etc. (Some of the sensors may be received in sensor ports, whereas other sensors may be attached to the derailer unit in another manner.) The derailer device includes an attachment feature 3180 for removable attachment of the housing of the electronic communication unit to the derailer device. The attachment feature is a designated space on the derailer device that is sized and/or otherwise configured for attachment of the housing to the derailer device. Examples include a flat land/surface, a receptacle, an area delineated by peripheral tabs or other locating features, etc. The derailer device may also include fastener or fastener-related devices such as retainer clips, fastener apertures, or the like.

In embodiments, the electronic communication unit may include one or more sensors that are at least partially located inside the housing. For example, a GPS sensor or other sensor configured to generate location data may be positioned fully or partially inside the housing.

Figure 32:
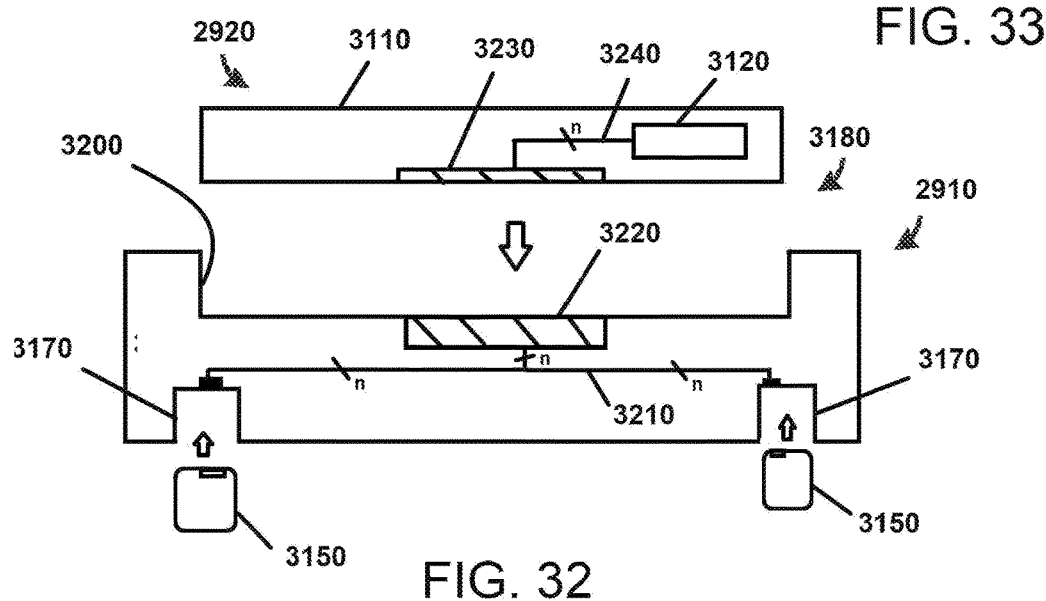
FIG. 32 is a side view, partially in schematic, of another embodiment of a derailer system.

In an embodiment, with reference to FIG. 32, the attachment feature 3180 includes a receptacle 3200 configured to removably receive the housing 3110. Additionally, the derailer device 2910 includes the plural sensor ports 3170, and plural first electrical lines 3210 electrically connecting the plural sensor ports to a first set of plural electrical connectors 3220 positioned within the receptacle. ("n" in the figure represents a whole number of two or more, e.g., there could be two lines, such as a positive voltage and ground, or three lines such as positive and negative and ground lines, or four lines, such as two positive and two ground or negative lines, or more than four lines, etc.) The plural sensors 3150 are configured to be electrically connected to the plural first electrical lines when disposed in the sensor ports and thereby electrically connected to the first set of plural electrical connectors. (For example, the sensors and sensor ports may include matching, selectively engageable electrical connectors, with the connectors of the sensor ports connected to the plural first electrical lines.) The electronic communication unit 2920 further includes a second set of plural electrical connectors 3230 disposed on an outside of the housing. The second set of plural electrical connectors is configured to respectively electrically couple with the first set of plural electrical connectors when the housing is removing received in the receptacle with the second set of plural electrical connectors aligned with the first set of plural electrical connectors. The electronic communication unit further includes plural second electrical lines 3240 respectively electrically connecting the second set of plural electrical connectors to the controller circuit 3120.

Figure 33:
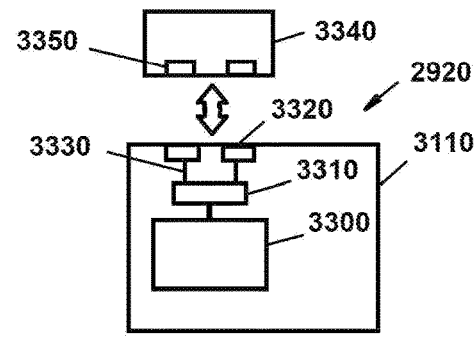
FIG. 33 is a schematic view of an embodiment of a communication unit.

In another embodiment, with reference to FIG. 33, the energy storage device may include a rechargeable battery unit 3300 and a charging circuit 3310. Additionally, the electronic communication unit 2920 may also include a third set of plural electrical connectors 3320 disposed on the outside of the housing 3110, and plural third electrical lines 3330 respectively electrically connecting the third set of plural electrical connectors to the charging circuit and/or rechargeable battery unit. (E.g., there may be two connectors and two electrical lines for two voltage connections, such as positive and ground.) The third set of plural electrical connectors may be configured for electrical attachment to an external battery charging device 3340.

For example, the battery charging device may include a battery charging device connector assembly 3350 configured for removable electrical attachment to the third set of plural electrical connectors. The battery charging device is configured to provide electrical power to the rechargeable battery unit to recharge the rechargeable battery unit when the housing and the battery charging device are coupled together.

Figure 34:
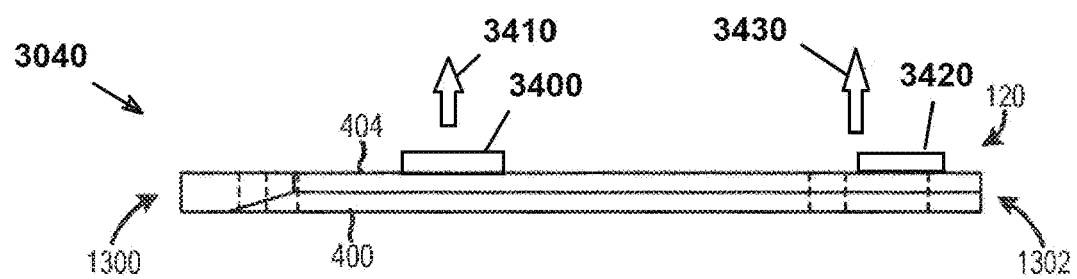
FIG. 34 is a view of an embodiment of the derail block with sensors.

In embodiments, with reference to FIG. 34, the electronic communication unit may further include a first derail block sensor 3400 operably coupled to the derail block 3040 at a first location and configured to generate first derailing data 3410 indicative of sensing the wheel being deflected by the wheel deflecting surface 400. The electronic communication unit is configured to communicate the first derailing data to the remote computing unit. In another embodiment, the electronic communication unit may further include a second derail block sensor 3420 operably coupled to the derail block at a second location and configured to generate second derailing data 3430 indicative of sensing the wheel being deflected by the wheel deflecting surface. The electronic communication unit is also configured to communicate the second derailing data to the remote computing unit. In any such embodiments, the derail block sensors may be force sensors adhered or otherwise operably coupled to (e.g., using fasteners) the outer surface 404/rear side 1302 of the derail block. In one aspect, the first location may be where a vehicle wheel would first contact the derail block, and the second location may be where the vehicle wheel would contact the derail block if it continued moving beyond the first location, e.g., toward or to a point where the wheel was de-railed. Thus, the system may be configured to differentiate, based on correlating the first derailing data to the second derailing data, if the wheel merely 'bumped up against' the derailing device, or instead was derailed by the derailing device.

In other embodiments, the housing of the electronic communication unit may be permanently connected to the derailer device. Additionally, the energy storage device may be removably received in the permanently-connected housing, and/or the electronic communication unit may further include plural charging connectors and a charging circuit as generally shown in the embodiment of FIG. 33.

According to aspects of the invention, a system may include a derailer device and an electronic communication unit, e.g., as described herein. The derailer device includes one or more sensor ports, and an attachment feature for selectively attaching the electronic communication unit to the derailer device. In one mode of distribution to end users, only the derailer device, without the electronic communication unit (and without sensors) is provided. In this mode, the derailer device can be used, e.g., at a lower cost, as a mechanical device for derailing rail vehicles. In another mode of distribution to end users, both the derailer device and the electronic communication unit (with sensors) are provided. In this mode, the system can be used both as a derailer and for communicating data about the derailer, e.g., location, installation status, derailing status, and so on. Thereby, the same derailer device can be provided in both modes, but at different cost points, for providing mechanical derailer functionality with or without advanced connectively for data reporting.

In embodiments, a derailer device includes identifying information that identifies the derailer device (such as a unique identifier) and/or that conveys information of a configuration of the derailer device, such as number and type of clamping mechanisms, speed rating (e.g., max speed of a designated vehicle weight/type that will be derailed by the derailing device), date entered into service, type and number of sensors affixed to the derailer device, and so on. The electronic communication unit may be configured, when attached to the derailer device, to detect the identifying information, and to operate in a selected one of several different available operating modes as a function of the detected identifying information. For example, the electronic communication unit may self-configure to receive signals from two sensors if the derailer device has two sensors, from three sensors if it has three sensors, and so on. Or the electronic communication unit may be configured to communicate an alert to a remote computing unit if one or more sensors detect a force applied to the derail block above a selected force threshold, where the force threshold is variable and selected based on a speed rating of the derailer device. (E.g., higher force thresholds for higher speed ratings and lower force thresholds for lower speed ratings.) In another aspect, the electronic communication unit may be configured to communicate the detected identifying information to a remote computing unit. Such as a unique identifier of the derail device. For detecting the identifying information affixed to the derailer device, the electronic communication unit and derailer device may have an RFID tag reader and RFID tag, respectively (the tag on the derailer device incorporating the identifying information and readable by the tag reader of the electronic communication unit). Alternatively, as another example, the identifying information may be encoded in a bar code (or optically-readable code pattern) affixed to the attachment feature of the derailer device, with the electronic communication unit having an optical code reader on its underside that aligns with the bar code, for the optical code reader to read the bar code, when the electronic communication unit is affixed to the derailer device at the attachment feature.

In embodiments, the electronic communication unit is configured to communicate data (e.g., derailing data, location data, installation status data, identifying information of the derailer device, etc.) to a remote computing unit. The remote computing unit may be configured to act responsively to receiving the data. For example, generating signals to display and/or store data of where the derailer device (associated with the electronic communication unit) is currently located, or generating signals to alert work crews if a derailing event is detected (e.g., time and location of the derailing event), or generating signals to alert work crews if it appears that the derailer device is intended to be affixed to a rail but might not be properly affixed to the rail, as per designated criteria (e.g., two sensors indicate that two respective clamping mechanisms are fully clamped, but a third sensor indicates that a third clamping mechanism is not fully clamped), and so on.

The above description is illustrative and not restrictive. For example, the above-described embodiments (and/or aspects thereof) may be used in combination with each other. In addition, modifications may be made to adapt a situation or material to the teachings of the inventive subject matter without departing from its scope. While the dimensions and types of materials described herein are intended to define the parameters of the inventive subject matter, they are not limiting and are example embodiments. Many other embodiments will be apparent to those of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general-purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings. As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
  a derailer device comprising:
    a first derail block extending from a base and including a wheel deflecting surface, the wheel deflecting surface configured to be arranged at a first angle relative to a longitudinal axis of a track when the derailer device is attached to the track and configured to deflect a wheel of a vehicle away from and off the track, the first angle less than or equal to about 13 degrees; and
    at least three clamping mechanisms positioned along the base and configured to engage with a rail of the track on a side of the track opposite the wheel deflecting surface and toward which the wheel is deflected by the wheel deflecting surface, with each of the at least three clamping mechanisms spaced apart from one another so as to enable forces to be dispersed as the wheel is deflected away from and off the track; and
  an electronic communication unit attached to the derailer device and configured to communicate at least one of location data of the derailer device and/or installation status data of the derailer device to a remote computing unit.

2. The system of claim 1, wherein an overall length of the derailer device is greater than or equal to about 53 centimeters (cm) (21 inches (in)), and where each of the at least three clamping mechanisms includes a clamping arm, is coupled to the base, and is configured to attach to the track.

3. The system of claim 2, where the at least three clamping mechanisms are equally spaced along the base, and wherein the wheel deflecting surface is formed with multiple angles relative to the rail.

4. The system of claim 1, wherein the derailer device further comprises a grab plate coupled to the base and including a plurality of steps, each of the plurality steps having a rise greater than or equal to about 1 cm (0.4 in) and a run greater than or equal to about 2 cm (0.8 in).

5. The system of claim 4, where the first angle is less than or equal to about 10 degrees and an overall length of the derailer device is greater than or equal to about 60 cm (24 in).

6. The system of claim 1, where a weight of the derailer device is less than or equal to about 29 kilograms (kg) (65 pounds (lb)).

7. The system of claim 1, where the wheel deflecting surface includes a first section of the derailer device, where the first section is arranged at the first angle, where the first derail block includes a second section arranged at a second angle with regard to the longitudinal axis of the track, and where the second angle is greater than the first angle.

8. The system of claim 1, wherein the derailer device further comprises a second derail block disposed adjacent to the first block and configured to be arranged at a second angle with regard to the longitudinal axis of the track when the derailer device is attached to the track.

9. A system comprising:
a derailer device comprising:
a first derail block extending from a base and including a wheel deflecting surface, the wheel deflecting surface configured to be arranged at a first angle relative to a longitudinal axis of a track when the derailer device is attached to the track and configured to deflect a wheel of a vehicle away from and off the track;
plural clamping mechanisms positioned along the base, wherein each of the clamping mechanisms is configured to exert a clamping force on a section of a rail of the track, on a yard side of the track that is opposite the wheel deflecting surface and toward which the wheel is deflected by the wheel deflecting surface; and
an electronic communication unit configured for attachment to the derailer device and configured to communicate at least one of location data of the derailer device and/or installation status data of the derailer device to a remote computing unit.

10. The system of claim 9, wherein the electronic communication unit comprises:
a GPS sensor configured to generate the location data, the location data including a determined location of the derailer device; and
plural clamping mechanism sensors configured to sense respective clamping statuses of the plural clamping mechanisms, the installation status data including data of the clamping statuses.

11. The system of claim 10, wherein the electronic communication unit further comprises a first derail block sensor operably coupled to the derail block at a first location and configured to generate first derailing data indicative of sensing the wheel being deflected by the wheel deflecting surface, and
wherein the electronic communication unit is further configured to communicate the first derailing data to the remote computing unit.

12. The system of claim 11, wherein the electronic communication unit further comprises a second derail block sensor operably coupled to the derail block at a second location and configured to generate second derailing data indicative of sensing the wheel being deflected by the wheel deflecting surface, and
wherein the electronic communication unit is further configured to communicate the second derailing data to the remote computing unit.

13. The system of claim 9, wherein the electronic communication unit further comprises a first derail block sensor operably coupled to the derail block at a first location and configured to generate first derailing data indicative of sensing the wheel being deflected by the wheel deflecting surface, and
wherein the electronic communication unit is further configured to communicate the first derailing data to the remote computing unit.

14. The system of claim 9, wherein:
the electronic communication unit comprises: a housing; a controller circuit, a communication component, and an energy storage device all at least partially housed in the housing; and plural sensors configured to generate the installation status data, the plural sensors positioned outside the housing and configured for communication with the controller circuit;
the derailer device includes plural sensor ports configured to respectively receive the plural sensors at plural respective locations of the derailer device for the plural sensors to generate the installation status data; and
the derailer device includes an attachment feature for removable attachment of the housing of the electronic communication unit to the derailer device.

15. The system of claim 14, wherein the attachment feature is a receptacle configured to removably receive the housing.

16. The system of claim 15, wherein:
the derailer device comprises plural first electrical lines electrically connecting the plural sensor ports to a first set of plural electrical connectors positioned within the receptacle, wherein the plural sensors are configured to be electrically connected to the plural first electrical lines when disposed in the sensor ports and thereby electrically connected to the first set of plural electrical connectors; and
the electronic communication unit further comprises a second set of plural electrical connectors disposed on an outside of the housing, the second set of plural electrical connectors being configured to respectively electrically couple with the first set of plural electrical connectors when the housing is removing received in the receptacle with the second set of plural electrical connectors aligned with the first set of plural electrical connectors, and the electronic communication unit further comprising plural second electrical lines respectively electrically connecting the second set of plural electrical connectors to the controller circuit.

17. The system of claim 16, wherein: the energy storage device comprises a rechargeable battery unit; and the electronic communication unit further comprises: a third set of plural electrical connectors disposed on the outside of the housing; and plural third electrical lines respectively electrically connecting the third set of plural electrical connectors to the rechargeable battery unit, wherein the third set of plural electrical connectors is configured for electrical attachment to an external battery charging device.

18. The system of claim 17, further comprising the battery charging device, the battery charging device having a battery charging device connector assembly configured for removable electrical attachment to the third set of plural electrical connectors, wherein the battery charging device is configured to provide electrical power to the rechargeable battery unit to recharge the rechargeable battery unit when the housing is coupled to the battery charging device.

19. The system of claim 9, wherein the electronic communication unit comprises a housing that is permanently connected to the derailer device.

20. The system of claim 19, wherein the electronic communication unit comprises an energy storage device, wherein: the energy storage device is removably received in the housing; and/or the electronic communication unit further comprises plural charging connectors attached to an exterior of the housing and a charging circuit, the charging circuit electrically connected to the plural charging connectors, and the charging circuit configured to charge the energy storage device when an external source of electrical power is connected to the plural charging connectors.

\* \* \* \* \*